United States Patent
Heming et al.

(10) Patent No.: US 7,199,185 B2
(45) Date of Patent: Apr. 3, 2007

(54) USE OF REACTIVE POLYMERIC SURFACTANTS IN THE FORMATION OF EMULSIONS

(75) Inventors: Alexander Mark Heming, Bracknell (GB); Patrick Joseph Mulqueen, Bracknell (GB); Herbert Benson Scher, Bracknell (GB); Ian Malcolm Shirley, Bracknell (GB)

(73) Assignee: Syngenta Limited (GB)

( * ) Notice: Subject to any disclaimer, the term of this patent is extended or adjusted under 35 U.S.C. 154(b) by 145 days.

(21) Appl. No.: 10/480,405

(22) PCT Filed: Jun. 10, 2002

(86) PCT No.: PCT/GB02/02744

§ 371 (c)(1),
(2), (4) Date: May 27, 2004

(87) PCT Pub. No.: WO02/100525

PCT Pub. Date: Dec. 19, 2002

(65) Prior Publication Data

US 2004/0197357 A1    Oct. 7, 2004

(30) Foreign Application Priority Data

Jun. 11, 2001   (GB) ................. 0114197.7

(51) Int. Cl.
B32B 27/30     (2006.01)
B32B 27/00     (2006.01)
B32B 27/14     (2006.01)
B32B 27/16     (2006.01)

(52) U.S. Cl. .............. 524/846; 524/800; 524/801; 524/802; 524/804; 524/812; 524/819; 524/821; 524/822; 524/823; 524/824; 524/832; 524/833; 524/845; 524/916

(58) Field of Classification Search ............... 524/800, 524/801, 802, 804, 812, 819, 821, 822, 823, 524/824, 832, 833, 845, 846; 264/4.1, 4.3, 264/4.33, 4.7
See application file for complete search history.

(56) References Cited

U.S. PATENT DOCUMENTS 4,977,059 A    12/1990   Liang et al.
5,089,259 A    2/1992    Wessling et al.

FOREIGN PATENT DOCUMENTS

| EP | 0374796 | 6/1990 |
| EP | 0671206 | 9/1995 |
| WO | 9600251 | 1/1996 |
| WO | 9724179 | 7/1997 |
| WO | 0020520 | 4/2000 |

*Primary Examiner*—Sanza L McClendon
(74) *Attorney, Agent, or Firm*—Rebecca Gegick

(57) ABSTRACT

Reactive polymeric surfactants are disclosed, and their use in processes for preparation of microcapsules, and in stabilising emulsions. The surfactants are random graft polymers or block copolymers which contain both hydrophobic and hydrophilic units and in which the hydrophobic unit includes a hydrophilic cross-linking unit which reacts with (a) a wall forming ingredient in a microencapsulation process, or (b) an ingredient in the disperse phase of an emulsion.

24 Claims, No Drawings

USE OF REACTIVE POLYMERIC SURFACTANTS IN THE FORMATION OF EMULSIONS

This application is a 371 of International Application No. PCT/GB02/02744 filed Jun. 10, 2002, which claims priority to GB 0114197.7, filed Jun. 11, 2001, the contents of which are incorporated herein by reference.

BACKGROUND OF THE INVENTION

This invention relates to the use of reactive polymeric surfactants in the formation of emulsions and further to the use of reactive polymeric surfactants in the formation of emulsions used to prepare microencapsulated products.

The reactive polymeric surfactants for use this invention (also referred to herein as polymeric stabilisers) generally have three moieties—a hydrophilic moiety, a hydrophobic moiety and a moiety that possesses reactive or cross-linking ability with respect to a monomer or prepolymer substance, or with respect to a selected ingredient in the dispersed phase of the emulsion. When these surfactants are used with a discontinuous phase dispersed in a predominantly aqueous continuous phase the hydrophobic moiety adsorbs strongly to the surface of the discontinuous phase while the hydrophilic moiety associates strongly with the aqueous phase, thereby conferring colloidal stability upon the discontinuous phase. The cross-linking moieties enable the surfactant to become reacted with or bound to the monomer or polymer or other ingredient as mentioned above, while the colloid stabilizing moieties of the surfactant provide surface active properties to the thus combined surfactant/monomer or polymer. Emulsions according to the invention may be used for a variety of purposes including the formulation of agrochemical active ingredients. As will be described below, the surfactants for use in this invention also provide a similar combining/surface active feature when used with emulsions used to prepare microencapsulated products.

The surfactants for use in this invention are selected from certain random graft copolymers and certain block copolymers. It should be noted that the random graft copolymers and block copolymers for use in the present invention are surfactants in their own right which are then bound at the emulsion interface by reaction of the cross-linking moiety.

Emulsions are important agricultural formulation types, for example as oil-in-water emulsions (EW's) or as components of suspo-emulsions (SE's) that comprise and EW and a suspension concentrate (SC). Emulsions may be become unstable for a number of reasons and may coalesce, flocculate or sediment. Such phenomena are undesirable and may complicate or prevent the use of the formulation. Thus considerable effort has been directed towards understanding how to induce stability by methods such as density matching, producing narrow particle size distributions to limit Ostwald ripening, and by using the optimum surfactants and colloid stabilisers. Ostwald ripening of emulsions may be promoted by surfactants that can carry the oil from droplet to droplet through the continuous phase, for example in micelles. Ostwald ripening may be prevented or inhibited by surfactants that do not form such carriers or that are fixed to the emulsion interface.

Conventional emulsion surfactants that are physically adsorbed at the interface between the discontinuous and continuous phases may be displaced by competitive desorption by other surface active agents that may be added to the formulation or by conditions that stress the formulation, for example temperature cycling and electrolyte concentration.

We have found that the stability of emulsions may be improved where the surfactants are fixed to the emulsion interface according to the present invention. Foaming is also eliminated when no free surfactant is available in the continuous phase.

Micro-encapsulation is a well-known technique used to prepare solid particles that contain enclosed within them a core comprising liquid and/or solid materials derived from a dispersed liquid emulsion phase. Thus the liquid core materials may be liquids per se, or liquids containing solids dissolved or suspended in them. Depending on the design of the microcapsule, the material enclosed will be released either in a slow controlled manner, or in a quick release. There are numerous well-known techniques for designing the contents and nature of the polymeric wall of the microcapsule to achieve these desired results. In the agricultural field, such microcapsules are used with pesticides such as herbicides, insecticides, fungicides, and bactericides, with plant growth regulators and with fertilizers. Non-agricultural uses include encapsulated dyes, inks, pharmaceuticals, flavouring agents and fragrances wherein the encapsulated medium is present as a liquid core.

The materials used in forming the walls of the microcapsules are typically resin intermediates or monomers. Various processes for microencapsulating material have been developed and described in the prior art. These processes can be divided into three broad categories—physical, phase separation and interfacial reaction methods. Phase separation and interfacial reaction methods generally proceed via the formation of an emulsion and are therefore of particular relevance to the process of the present invention.

In one process in the phase separation category, microcapsules are formed by emulsifying or dispersing the core material in an immiscible continuous phase in which the wall material is dissolved and then is caused to physically separate from the continuous phase, for example, by coacervation, and deposit around the core particles. In the interfacial reaction category, the core material is emulsified or dispersed in an immiscible continuous phase; then an interfacial polymerization reaction is caused to take place at the surface of the core particles, forming microcapsules.

Interfacial polymerization reaction methods have proven to be the most suitable processes for use in the agricultural industry for the microencapsulation of pesticides. There are various types of interfacial reaction techniques. In one type of interfacial condensation polymerization microencapsulation process, monomers from both the oil and aqueous phases are brought together at the oil/water interface where they react by condensation to form the microcapsule wall. In another type of polymerization reaction, the in situ interfacial condensation polymerization reaction, all of the wall-forming monomers or prepolymers are contained in the oil phase. The oil is then dispersed into a continuous aqueous phase comprising water and a surface-active agent. The organic phase is dispersed as discrete droplets throughout the aqueous phase by means of emulsification, with an interface between the discrete organic phase droplets and the surrounding continuous aqueous phase solution being formed. In situ condensation of the wall-forming materials and curing of the polymers at the organic-aqueous phase interface may be initiated by heating the emulsion to a temperature between of about 20° C. to about 100° C., optionally with adjustment of the pH. The heating occurs for a sufficient period of time to allow substantial completion of in situ condensation of the wall-forming monomers or prepolymers to convert the organic droplets to capsules consisting of solid permeable polymer shells enclosing the organic core materials.

One type of microcapsule prepared by in situ condensation and known in the art is exemplified in U.S. Pat. Nos. 4,956,129 and 5,332,584, which are incorporated herein by reference. These microcapsules, commonly termed "aminoplast" microcapsules, are prepared by the self-condensation of etherified urea-formaldehyde resins or prepolymers in which from about 50 to about 98% of the methylol groups have been etherified with a $C_4$–$C_{10}$ alcohol (preferably n-butanol). The prepolymer is added to or included in the organic phase of an oil/water emulsion. Self-condensation of the prepolymer takes place under the action of heat at low pH.

To form the microcapsules, the temperature of the emulsion is raised to a value of from about 20° C. to about 90° C., preferably from about 40° C. to about 90° C., most preferably from about 40° C. to about 60° C. Depending on the system, the pH value may be adjusted to an appropriate level. For the purpose of this invention a pH of about 2 is appropriate.

Another type of microcapsule prepared by in situ condensation and described in U.S. Pat. No. 4,285,720, incorporated herein by reference, is a polyurea microcapsule that involves the use of at least one polyisocyanate such as polymethylene polyphenyleneisocyanate (PMPPI) and/or tolylene diisocyanate (TDI) as the wall forming material. In the process described in this patent, the wall forming reaction is initiated by heating the emulsion to an elevated temperature at which point the isocyanate groups are hydrolyzed at the oil/water interface to form amines, which in turn react with unhydrolyzed isocyanate groups to form the polyurea microcapsule wall.

In another type of interfacial polymerization process, as mentioned above, wall-forming materials are contained in both the organic and aqueous phases of the emulsion. Such a process is described, for example, in U.S. Pat. No. 4,280,833 in which an isocyanate such as PMPPI is contained in the organic phase and a reactive amine such as hexamethylenediamine is contained in the aqueous phase. The two-wall forming materials react at the interface between the two phases to produce a polyurea microcapsule shell that contains or encloses materials to be encapsulated, which are themselves contained in the organic phase of the emulsion.

In most of these types of microencapsulation processes, external surfactants and/or other surface-active agents such as emulsifiers or colloid stabilizers, are employed. These materials, indeed, are employed in both the processes for preparing the microcapsules and in resulting formulations of them or produced from them. The emulsifier serves to reduce the surface tension between the oil and aqueous phases while the colloid stabiliser serves to ensure that the particles are kept apart. In the emulsification process the droplet size is largely controlled by the degree of applied shear and the type and amount of emulsifier employed. If there is significant competition between the emulsifier and the colloid stabiliser for adsorption to the oil droplet the colloid stabiliser may be displaced, leading to droplet coalescence. Following capsule formation, generally the same colloid stabiliser must stabilise a solid particle that has properties different from those of the starting oil droplet. If the colloid stabiliser is displaced from the capsule surface, the capsules may irreversibly agglomerate. Some protective colloids are disclosed, for instance, in U.S. Pat. Nos. 4,448,929 and 4,456,569, together with the patents mentioned above describing microencapsulation processes. Similarly, surface-active agents are needed in formulations made from the microcapsules. For example the products of typical microencapsulation processes are suspensions of the microcapsules in the aqueous phase (generally termed "capsule suspensions"). In some cases the capsule suspension will be packaged and sold as such. However, so doing requires the storage and transportation of substantial amounts of water or other liquid. Therefore, another technique is to produce a dried microcapsule product (for example by spray drying or film drying of the capsule suspension) and then sell the dried product, either as a powder or in another solid form, such as tablets, extruded granules, etc. In all these cases, the dried product is designed to be mixed with water to form a sprayable suspension of the microcapsules. In order for the sprayable suspension (whether prepared from a powder, granule, or other form of microcapsule) to be relatively uniform so as to provide a substantially uniformly effective product when sprayed, it is necessary that the microcapsules be well dispersible in water. The inclusion of surface-active agents in the product as sold, or the addition of surface-active agents to the applicator's spray tank or other spraying equipment is often necessary to accomplish this purpose.

In all of the above-mentioned uses of surface active agents, certain shortcomings or disadvantages may appear. A typical one is that a surface active agent may become disassociated from the particles with which it is meant to interact. This can occur in emulsion or emulsion formation, or in production or formulation of microcapsules. In such case, the effectiveness of the surface active agents is decreased or lost because the uniformity of particle size or particle dispersability is not attained.

The properties of these surface active agent materials are determined by the composition and quantity of their hydrophobic and hydrophilic components. Where the formulation comprises a discontinuous oil phase dispersed in an aqueous continuous phase, the hydrophobic components of the surface active agents must adsorb strongly to the surface of the discontinuous phase while the hydrophilic components of the surface active agents must afford colloidal stability, thereby preventing the discontinuous phase from agglomerating.

The compositions and methods of preparation of polymeric surfactants are many and varied. A review of such materials is given in the text by Piirma: *Polymeric Surfactants*, Surfactant Science Series 42, (Marcel Dekker, New York, 1992). The two main classes of polymeric surfactants are those prepared as hydrophilic-hydrophobic blocks and those prepared as combs of hydrophilic arms attached to a hydrophobic backbone, and vice versa. Such hydrophobic-hydrophilic polymers have been termed "amphipathic" or "amphiphilic". Adsorption to the discontinuous phase is maximised where the surfactants have little or no propensity to micellise in the continuous phase.

In general, polymeric surfactants may be made by modifying previously prepared polymers or by polymerisation in a single step or stepwise manner. For example block copolymers can be made by (i) the controlled stepwise polymerisation of firstly hydrophobic and secondly hydrophilic monomers, or the reverse of this process, or by (ii) coupling together pre-formed hydrophobic and hydrophilic materials of suitable molecular weight. Graft copolymers can be made by (i) graft polymerisation of hydrophilic monomers or macromonomers to a hydrophobic backbone, or the reverse of this process, or by (ii) chemically converting suitable monomers which have been co-polymerised with hydrophobic or hydrophilic backbone monomers. Polymers having similar surfactant properties to those of graft copolymers can be made by randomly copolymerising hydrophilic and hydrophobic monomers or hydrophilic macromers and hydrophobic macromers.

The preferred preparative method for any given composition will depend on the nature and properties of the starting materials. For example, the reactivity ratios between certain monomers may limit the amount of a hydrophilic monomer that can be radically co-polymerised with hydrophobic monomers.

Although non-reactive surfactants/emulsifiers and colloid stabilisers are very widely used, formulations made from these materials sometimes have disadvantages. For example these 'conventional' materials are adsorbed to the interface of the discontinuous phase simply by physical adhesive forces and, under certain circumstances, can be desorbed, thereby resulting in colloid instability. Surfactants which can form micelles may aid the transport of material from the colloid to the continuous phase. This may be undesirable if the transported material is able to change its physical state, for example by crystallization, in the continuous phase. The preparation of certain formulations such as microcapsules made by interfacial polymerisation methods may require high levels of surfactant which may adversely affect both processing and the properties of the capsules. Moreover high levels of 'free' surfactant may be washed off in the aqueous phase leading to undesirable environmental contamination.

The above disadvantages may be largely overcome if the surfactants become chemically or irreversibly bound to the surface of the discontinuous phase.

One example of this approach is disclosed in U.S. Pat. No. 5,925,464. As described in that patent, polyvinyl alcohol (PVA) is utilized during a microencapsulation process, preferably one between a polyisocyanate and a polyamine, and reacts with the isocyanate to incorporate polyurethane groups into the microcapsule walls. This enables the surface active properties of PVA to be bound to the microcapsules and, as stated in the patent, "to produce a uniform layer of water-soluble polymer around each capsule" which should film form when dried. PCT application WO 98/03065 discloses a similar concept using what is termed "a non-micellising surfactant" (however, the only surfactant disclosed in the text is PVA.)

It would be advantageous to provide surfactants that can become bound to the surface of such microcapsules or alternatively can become bound to emulsion droplets so that the surface-active action is maintained relatively uniformly throughout the resulting product or is available relatively uniformly during the process of preparing the product, for instance, processes for producing microcapsules.

In U.S. Pat. No. 6,262,152 (Fryd et al) there is disclosed a dispersion of particles such as pigments in a liquid vehicle in which the solid particle is insoluble wherein the particles are entrapped in a polymer matrix formed by cross-linking of moieties of a polymer dispersant having at least one segment soluble in the liquid vehicle and at least one segment insoluble in the liquid vehicle wherein said insoluble segment has the cross linkable moieties. The network or matrix of cross-linked polymer matrix which surrounds each particle is formed of very stable cross-linking bonds which effectively prevent the particle from leaving the "core" formed by the polymer. The Examples show that a relatively high proportion of polymer is required to provide this polymer matrix which surrounds and entraps the particle.

SUMMARY OF THE INVENTION

According to the present invention there is provided an emulsion comprising a liquid continuous phase and a liquid discontinuous phase and an emulsion stabilising amount of the reaction product of (i) a polymeric stabiliser having a hydrophilic moiety and a hydrophobic moiety and comprising a plurality of vinylic monomers, not being exclusively of vinylic esters or of their hydrolysed products, at least some of which contain functional groups capable of undergoing cross-linking nucleophilic or condensation reactions at the interface of the dispersed and continuous phases of the emulsion and (ii) one or more substances dissolved the liquid discontinuous phase capable of reacting with said functional groups.

It is to be understood that the phrase "liquid discontinuous phase" as used herein includes a liquid discontinuous phase having a solid dispersed therein.

Emulsions of the invention are particularly suitable for use in a microencapsulation process.

Thus according to a further aspect of the present invention there is provided a process for the production of microcapsules which comprises (i) preparing an emulsion in which the discontinuous phase contains one or more monomers or prepolymers capable of forming a microcapsule wall and one or more materials to be encapsulated, (ii) forming microcapsules by interfacial polymerisation adjacent to the interface between the discontinuous phase and the continuous phase of the emulsion, wherein one or more of said monomers or prepolymers is reacted before and/or after preparation of the emulsion, with a polymeric stabiliser having a hydrophilic moiety and a hydrophobic moiety and comprising a plurality of vinylic monomers, not being exclusively of vinylic esters or of their hydrolysed products, at least some of which contain functional groups capable of undergoing cross-linking nucleophilic or condensation reactions at the interface of the dispersed and continuous phases of the emulsion with said monomer or prepolymer.

In one embodiment, the polymeric stabilisers for use in this invention contain two types of units: a) hydrophobic units, which themselves contain cross-inking moieties; and b) hydrophilic groups which provide colloid stabilizing and other surface-active properties. The polymeric stabilisers for use in this invention generally comprise two types, namely random graft copolymers and block copolymers.

The polymeric stabilisers for use in this invention are composed of a plurality of vinylic monomers. Some of these, as discussed below, contain functional groups ("cross-linking groups") which are capable of undergoing a nucleophilic or condensation reaction with moieties or groups present in a variety of materials such as microcapsule wall-forming monomers or prepolymers, or other materials contained in the liquid phase of an oil-in-water emulsion. (This is as opposed to certain prior art surfactants having reactive functional groups that undergo radical, as opposed to nucleophilic or condensation reactions.) The reactions mentioned above take place at the interface of the two phases of an emulsion (that is, discontinuous and continuous phases, respectively.) The reactions in question take place with compounds or polymers that are dissolved in the liquid discontinuous phase.

DETAILED DESCRIPTION OF THE INVENTION

The invention entails the use of reactive polymeric stabilisers. These polymeric stabilisers contain reactive or linking groups that react with moieties on certain other materials so as to bind the surfactant to these materials. In one embodiment the materials in question are generally organic monomers or resins or prepolymers that are used to prepare polymeric microcapsules. The surfactants can ultimately bind either to the droplets of the emulsion or to the resulting microcapsules (or both). The reactive polymeric stabilisers of the present invention may be either random graft copolymers or block copolymers. In either case they contain hydrophobic units which themselves contain cross-linking groups, and also contain hydrophilic groups, which provide emulsion-stabilizing properties. The random graft copolymers have a hydrophobic "backbone" and hydrophilic "arms" whereas the block copolymers have hydrophobic and hydrophilic groups in which the hydrophobic group contains the cross-linking element.

The reactive polymeric surfactants for use in the present invention may contain more than one type of monomer capable of undergoing a cross-linking reaction. For example the copolymers may comprise both amine and carboxylic acid containing monomers such as in Examples 2e, 2f and 2g below. The copolymers may comprise both hydroxyl and carboxylic acid containing monomers such as in Example 1e below.

The polymeric stabilisers for use in this invention may be made as known in the art either by modifying previously prepared polymers or by production through polymerization in a single step or in a stepwise manner.

The reactive polymeric surfactants for use in this invention, both random graft copolymers and block copolymers, may be represented by the formula:

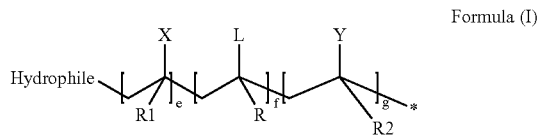

Formula (I)

where "Hydrophile", when present, is the residue of a hydrophilic initiator group; R1, R and R2 are independently H or methyl; X is a hydrophilic moiety; L is a moiety containing a cross-linking group; Y is a hydrophobic moiety; the value of e is from 0.005 to 0.35; the value of f is from 0.05 to 0.4 and the value of g is from 0.10 to 0.90

When the surfactant is a random graft copolymer, the units e, f and g are randomly distributed and when the surfactant is a block copolymer or in which the units f and g are contained in a hydrophobic block and the units e are contained in a hydrophilic block.

The expression "the units e, f and g" as used above indicates the moieties in square brackets preceding the subscripts e, f and g respectively in the above formula. Each unit e, f and g is derived from a corresponding vinylic monomer and, as noted above, each unit type e, f and g may comprise one or more different monomers. When R1, R and R2 respectively are hydrogen, the relevant monomer is an acrylate or styryl type monomer and when R1, R and R2 respectively are methyl, the relevant monomer is a methacrylate type monomer. Methacrylate monomers are generally preferred. A styrene type monomer (useful for example in unit e) has R1 as H and X as a phenyl derivative.

The values of e, f and g are determined essentially by the ratios of the monomers reacting to form the units e, f and g respectively.

If a hydrophilic initiator is used, the polymer will start with a hydrophilic group designated "Hydrophile" in Figure I. A typical hydrophilic initiator has the formula II

II wherein A is a group such as bromine that under certain conditions, such as in the presence of a transition metal complex, may be activated such that vinylic monomer units are inserted into the carbon-A bond and Z is a methoxypolyethylene glycol group. It will be appreciated that the group "Hydrophile" in Figure I is joined with one or more of the units e when e is present in a di-block copolymer. The units e are randomly distributed in a comb copolymer.

If a non hydrophilic initiator is used it will be appreciated that the reactive polymeric surfactant takes the formula IA

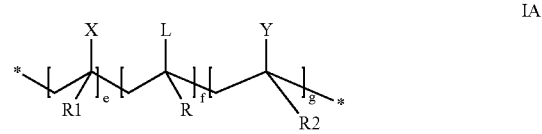

IA

It is preferred that in formula (I):

(i) the group e is derived from one or more monomers which is a methacrylate derivative (when R1 is methyl and the derivative function is —X) or is an acrylate derivative (when R1 is hydrogen and the derivative function is —X) or is a styrene derivative (when R1 is hydrogen and X is phenyl substituted with the hydrophilic moiety) wherein said derivative carries a hydrophilic moiety selected from $—SO_3^-$, polyethylene glycol optionally end-capped with C1–C4 alkyl; —COOH or a salt thereof; carboxybetaine; and sulfobetaine; a quaternary ammonium salt $—N^+R^3{}_3C^-$ where $R^3$ is H or C1–C4 alkyl or —CH$_2$CH$_2$OH (ii) the group f is derived from one or more monomers which is a methacrylate derivative (when R is methyl and the derivative function is -L) or is an acrylate derivative (when R is hydrogen and the derivative function is -L) or is a styrene derivative (when R is hydrogen and L is phenyl substituted by the cross-linking group) wherein said derivative carries a cross-linking group selected from —OH, including for example propylene glycol; —NHA where A is hydrogen or $C_1$–$C_4$ alkyl; and —COOH or a salt thereof; and (iii) the group g is derived from one or more monomers which is a methacrylate derivative (when $R_2$ is methyl and the derivative function is —Y) or is an acrylate derivative (when $R_2$ is hydrogen and the derivative function is —Y) or is a styrene derivative (when $R_2$ is hydrogen and Y is phenyl optionally substituted by a hydrophobic group) wherein said derivative is or carries a hydrophobic moiety selected from —CO—O—(—Si(CH$_3$)$_2$O—)$_n$—H wherein n is from 3 to 20; —CO—O— polypropylene glycol; —CO—O—A wherein A is a $C_1$–$C_{12}$ alkyl group, cycloaklyl group, alkylcycloalkyl group, aralkyl group or alkylaryl group; and —CONHB wherein B is a $C_5$–$C_{12}$ alkyl group.

It is especially preferred that the unit e is derived from one or more of the following monomers:

DMMAEA betaine*: 2-(N,N-Dimethyl-N-(2-methacryloxy-ethyl)ammonium)ethanoic acid, wherein R1 is methyl and —X has the formula

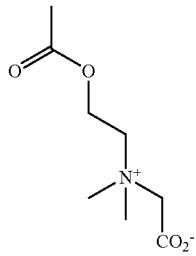

QuatDMAEMA: 2-(Trimethylammonium)ethyl methacrylate salt;

wherein R1 is methyl and —X has the formula wherein Hal⁻ is a suitable anion such as halide, for example iodide or chloride

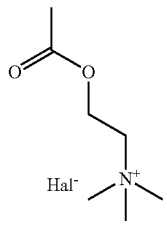

DMMAPSA betaine: 3-(N,N-Dimethyl-N-(2-methacryloxy-ethyl)ammonium)propyl-sulphonic acid, wherein R1 is methyl and —X has the formula

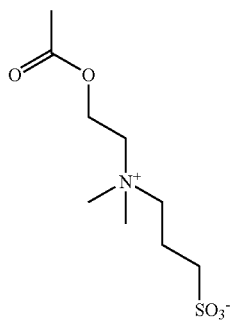

NaMAA*, the sodium salt of methacrylic acid, wherein R1 is methyl and —X has the formula

MAOES* mono-2-(Methacryloyloxy)ethyl succinate wherein R1 is methyl and —X has formula

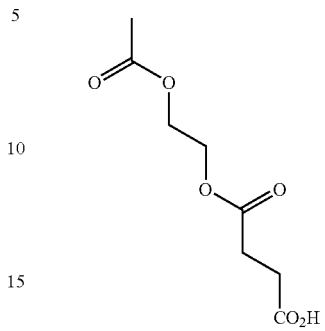

PEGMA: Mono-methoxy poly(ethylene glycol) mono-methacrylate; wherein R1 is methyl and —X has the formula wherein n indicates the average degree of polymerisation of the polyethylene glycol chain and is typically from 5 to 75

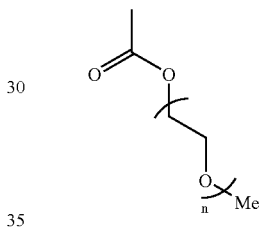

SSA: Styrene-4-sulfonic acid;

wherein R1 is hydrogen and —X has the formula

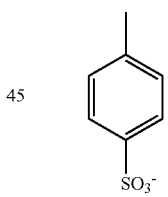

It is preferred that the unit f is derived from one or more of the following monomers:

AEMA: 2-Aminoethyl methacrylate wherein R is methyl and L is the group

HEMA: 2-Hydroxyethyl methacrylate, wherein R is methyl and L is the group

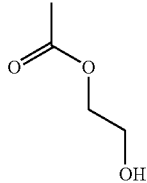

NaMAA* wherein R is methyl and L is the group

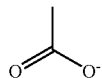

MAOES*: wherein R is methyl and L is the group

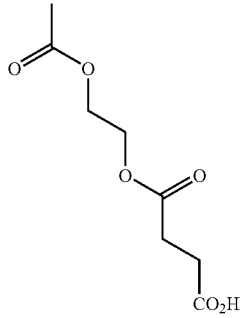

PPGMA*; Poly(propylene glycol) mono-methacrylate wherein R is methyl and L is the group wherein n indicates the degree of polymerisation of the propylene glycol and is preferably from 5 to 50

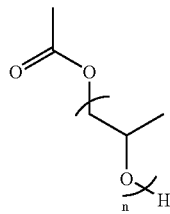

It is preferred that the unit g is derived from one or more of the following monomers:

methyl methacrylate wherein R is methyl and Y is the group:

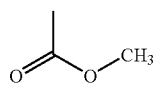

PDMSMA: Poly(dimethylsiloxane)mono-methacrylate, typically with an average molecular weight of 1000 wherein R is methyl and Y is the group

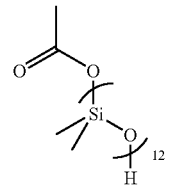

PPGMA*; Poly(propylene glycol) mono-methacrylate wherein R is methyl and L is the group wherein n indicates the degree of polymerisation of the propylene glycol and is preferably from 5 to 50. In general a relatively greater chain length is preferred in order to provide the necessary hydrophobic character.

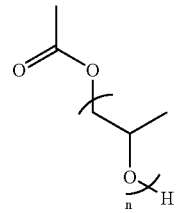

It will be noted that certain monomers (marked with an asterisk) occur in more than one group and for example have hydrophilic groups X that may if desired be used to provide cross linking (i.e. may also act as a moiety L). For example salts of carboxylic acids may be used for stabilisation, when the monomers bearing —$CO_2$X groups are incorporated into the hydrophilic part of the surfactant. Free carboxylic acids may however be used for cross-linking using aziridine or carbodiimide chemistry, when the monomers bearing the —$CO_2$H groups would be incorporated into the hydrophobic part of the surfactant. Clearly if —$CO_2$H is used for cross-linking it cannot be used for stabilisation. Where two different groups in the surfactant are capable of reacting in the cross linking chemistry, but have very different reactivity it is possible to use the less reactive group for stabilisation eg carboxylates in the hydrophile and hydroxyls in the hydrophobe sections. One skilled in the art is readily able to select the conditions such that a given group undergoes a cross-linking reaction or alternative conditions such that it does not.

Further examples of monomers which can be used to form unit "e" (and provide corresponding values of R1 and X) include 4-vinylbenzyl trimethyl ammonium chloride, 2-N-morpholinoethyl, 2-methacryloxyethylphosphonate methacrylate, 2-acrylamido-2-methylpropane sulphonic acid.

Further example of monomers which can be used to form unit "f" (and provide corresponding values of R and L) include 2-methoxy-4-vinylphenol, 4-vinylbenzyl alcohol, 4-vinylphenol, 2,6-dihydroxymethyl-4-methoxystyrene, 3,5-dimethoxy-4-hydroxystyrene, 2-hydroxy-3-methacryloxypropyl trimethyl ammonium chloride, 3-chloro-2-hydroxypropyl methacrylate, 3-hydroxypropyl methacrylate, 2-hydroxy-3-phenoxypropyl methacrylate, diethylene glycol mono-methacrylate, 2,3-dihydroxypropyl methacrylate, 2-methacryloxyethyl glucoside, sorbitol methacrylate, caprolactone 2-methacryloxyethyl ester, 4-hydroxybutyl methacrylate, 2-hydroxypropyl methacrylate, 4-aminostyrene, 2-(iso-propylamino)ethylstyrene, 4-N-(vinylbenzyl)aminobutyric acid, 3-N-styrylmethyl-2-aminoethylamino)-propyltrimethyoxysilane hydrochloride, N-(3-methacryloxy-2-hydroxypropyl)-3-aminopropyltriethoxysilane, 4-vinylbenzoic acid, 4-((3-Methacryloxy)propoxy)benzoic acid, mono-(2-(Methacryloxy)ethyl)phthalate.

Further example of monomers which can be used to form unit "g" (and provide corresponding values of $R_2$ and Y) include acrylate ($R_2$=H) or methacrylate ($R_2$=methyl) derivatives wherein Y is COOR, and R is alkyl, cycloalkyl, aralkyl or alkaryl, or poly(dimethylsiloxane), vinyl esters, vinyl halogens, styrene or optionally substituted styrenes.

As noted above, Formula (I) describes both random graft copolymer stabilisers and block copolymers. Random graft copolymer stabilisers useful in this invention have a hydrophobic backbone and hydrophilic "arms." A typical structure is illustrated below which includes a polymethyl methacrylate backbone containing methoxy-polyethylene glycol methacrylate and hydroxyethyl methacrylate moieties.

This structure is illustrated as Formula III

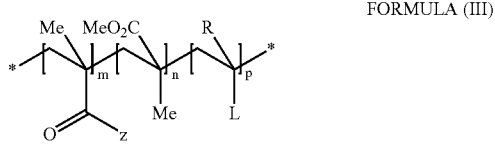

FORMULA (III)

In this structure, Z is a hydrophilic group such as methoxy-PEG in which PEG (polyethylene glycol) stands for a number of ethylene oxide units $(C_2H_4O)_q$. Z may alternatively be derived from a monomer which is another (meth)acrylate ester or functionalised (meth)acrylamide derivative that contains a hydrophilic group such as a sulphonate, for example 2-acrylamido-2-methylpropane sulphonic acid. Mixtures of groups Z may also be used.

L in the above structure is a cross-linking group such as —$CO_2CH_2CH_2OH$, in the monomer hydroxyethyl (meth)acrylate (where R=H or Me). L may alternatively be derived from a monomer which is another (meth)acrylate ester or functionalised (meth)acrylamide derivative containing a cross-linking group such as found in N-(2-hydroxylpropyl)methacrylamide or a substituted styryl derivative that contains a cross-linking group such as SH or OH or NHA in which A is hydrogen or $C_1$–$C_4$ alkyl, illustrated by the structure —$C_6H_4$—$CH_2NH_2$.

The values of m, ranges from about 0.05 to 0.35 and preferably 0.05 to 0.30, the values of n range from 0.13 to 0.90 and preferably from 0.50 to 0.80, and the values of p range from 0.02 to 0.35 and preferably from 0.02 to 0.20. The polymers are random graft (comb) copolymers because the units indicated as m, n, and p can be distributed in any order in the chain of the molecule. It will be appreciated that the moieties —CO—Z form the hydrophilic "arms" of the random graft copolymers and the remaining units form the hydrophobic backbone which also contains the cross-linking moieties L.

It will be appreciated that formula (III) is a more specific form of Formula (I) and that the monomers listed above in respect of formula (I) wherein —X has a carboxyl structure may be used to provide the relevant group —CO—Z in formula (III).

In general, random graft copolymers for use in this invention can be prepared by typical methods of preparing known random graft copolymeric surfactants or similar materials. These methods include (a) by graft polymerisation of hydrophilic monomers to a hydrophobic backbone or (b) the reverse of process a, or (c) by chemically converting suitable monomers that have been copolymerised with hydrophobic backbone monomers. Polymers having similar surfactant properties to those of graft copolymers can be made by randomly copolymerising hydrophilic and hydrophobic monomers.

The preferred method of preparation for any given graft or similar copolymer will depend on the nature and properties of the starting materials. For example, the reactivity ratios between certain monomers may limit the amount of a hydrophilic monomer that can be radically copolymerised with hydrophobic backbone monomers.

Some novel amphipathic graft copolymers and methods of preparation are shown in PCT application WO 96/00251.

Preferred block copolymers for use in the present invention are comprised of a hydrophilic A block, which in turn is comprised of a hydrophile and/or hydrophilic monomer(s) (—$CH_2CR^1X$—), that is adjoined to a hydrophobic B block which is comprised of randomly copolymerised hydrophobic monomer(s) (—$CH_2CR^2Y$—) and cross-linking units (—$CH_2CH_2CRL$—). These are illustrated as Formula IV which is a more specific version of formula (I).

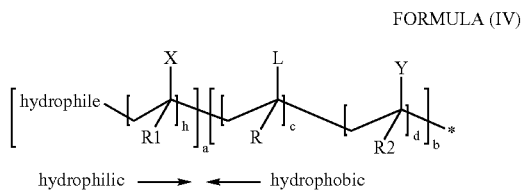

FORMULA (IV)

The hydrophilic A block may be made from one or more monomers which upon polymerisation and then optionally further chemical modification afford water-soluble polymers. The group designated "hydrophile" in Formula (IV) has the same meaning as given above in respect of Formula (I) and represents the residue of a methoxy (polyethyleneglycol) initiator. The monomers may be either nonionic or may be positively or negatively charged but, as part of the surfactant composition, should not react with the wall-forming materials in the oil with which the surfactants are to be employed.

In the above Formula IV, values for units a and b range from about 0.3 to about 0.7, and the values for c and d range from about 0.05 to about 0.35 and preferably from about 0.05 to about 0.25 and about 0.75 to about 0.95, respectively. The value of c is preferably selected so as to balance the hydrophobicity of the surfactant with the reactivity of the cross-linking group; a preferred range for c is from about 0.1 to 0.25. Units c and d (i.e. the unit within the square brackets before the subscripts c and d respectively) comprise the hydrophobic backbone of the block copolymer surfactants and are, for example, derived from acrylate or methacrylate or styryl structures. Unit d, for instance, may be an acrylate ($R_2$=H) or methacrylate ($R_2$=methyl) derivative wherein Y is COOR, and R is alkyl, cycloalkyl, aralkyl or alkaryl. The choice for Y determines the hydrophobicity of this unit of the surfactant. For instance, if Y is $CO_2C_8H_{17}$ and $R_2$ is hydrogen or methyl, this unit of the surfactant will be very hydrophobic. If, on the other hand, Y is $COOCH_3$ and $R_2$ is hydrogen, the unit is less hydrophobic. If d is a styryl unit (i.e., Y is phenyl and $R_2$ is hydrogen) the unit will be very hydrophobic.

Group c contains cross-linking groups within the moiety L and branching groups R (which are usually hydrogen or methyl). Cross-linking groups within the moiety L are preferably functional groups of esters that are capable of reacting with the wall-forming agents used in microcapsule production such as isocyanates. Cross-linking groups L preferably terminate in reactive groups such as —OH, —SH, —$CO_2H$ or —NHA where A is hydrogen or $C_1$–$C_4$ alkyl. Preferred units c include those derived from the monomers hydroxyethyl methacrylate (R=methyl, L=$COOCH_2CH_2OH$), methacrylic acid (R=methyl, L=—$CO_2H$), (mono-2-(methacryloyloxy)ethyl succinate (R=methyl, L=$COOCH_2CH_2OCOCH_2CH_2$—$CO_2H$), or 2-aminoethyl methacrylate (R=methyl, L=$COOCH_2CH_2NH_2$).

Hydrophilic units comprising block a are preferably methacrylate structures and the hydrophile is a group such as methoxy-PEG. Group X is preferably a hydrophilic moiety such as that in 2-(trimethylammonium)ethyl methacrylate iodide, 2-(N,N-dimethyl-N-(2-methacryloxyethyl)ammonium)ethanoic acid, 3-(N,N-dimethyl-N-(2-methacryloxyethyl)ammonium)propyl-sulphonic acid or styrene-4-sulfonic acid or 2-acrylamido-2-methylpropane sulphonic acid (AMPS).

Examples of water-soluble nonionic polymers suitable for use in the a block include, inter alia, poly(ethylene oxide) ("PEO"), poly(acrylamide), poly(vinyl pyrrolidone) ("PVP"), poly(methyl vinyl ether). PEO and PVP cannot be used in formulations containing polyacids that form complexes with their functional groups. The polymers may have linear or comb structures. Polymers such as polyethoxy (meth)acrylate, poly(vinyl alcohol), poly(ethylene imine), and poly(vinylamine) contain reactive groups that would react with isocyanates such as those used in polyurea microencapsulation processes and are not preferred for construction of the a block.

Examples of negatively charged monomers that may be included in these polymers include inter alia those made from (salts of) acrylic acid, methacrylic acid, beta-carboxyethylacrylic acid, mono-2-(methacryloyloxy)ethyl succinate, 4-vinylbenzoic acid, itaconic acid, vinyl sulphonic acid, 2-sulphoethyl methacrylate, 2-acrylamido-2-methylpropane sulphonic acid (AMPS), and 4-styrene sulphonic acid. Note that polyacrylic acid is not preferred to be used in combination with methoxy-PEG backbones since association will occur between them. However, (meth)acrylic acid could be used as a component of the hydrophobic sections of these surfactants since it would be present in comparatively lower amounts.

Examples of positively charged monomers that may be included in these polymers include inter alia those made from diallyldimethyl ammonium salts, quaternary salts of dimethylaminoethyl methacrylate (DMAEMA) and of dimethylaminoethyl acrylate.

The hydrophobic B block may be made from one or more monomers that upon polymerisation afford a water-insoluble polymer that may be strongly adsorbed to the surface of the discontinuous phase. Examples of suitable monomers include inter alia acrylate esters, methacrylate esters, vinyl esters, vinyl halogens, styrene or optionally substituted styrenes.

The cross-linking units may be co-polymerised at a desired mole ratio with the monomers of the hydrophobic B block. Typical ratios vary from two to ten units of hydrophobic monomers to one cross-linking units. The chosen ratio depends on the molecular weights and on the hydrophilic-hydrophobic balance of the hydrophobic and cross-linking units. The structure of the cross-linkers depends on the chemistry of cross-linking between the surfactant and the components contained within or on the discontinuous phase.

The cross-linking group on the reactive polymeric surfactant reacts with a substance dissolved in the liquid discontinuous phase (the reaction partner). In the process for the production of microcapsules, the reaction partner will be the monomer or prepolymer which is to form the microcapsule wall. An emulsion of the present invention may however involve a wider range of suitable reaction partners dissolved in the liquid discontinuous phase and capable of reacting with the cross-linking group on the reactive polymeric surfactant.

Many cross-linking chemistries are known. For example when the cross-linking moiety L terminates in a hydroxyl or thiol reactive group, suitable reaction partners may have as their corresponding reactive group for example isocyanate, ester or epoxide. When the cross-linking moiety L terminates in an amine reactive group, suitable reaction partners may have as their corresponding reactive group for example isocyanate, acetoacetoxy, aldehyde, acrylate, vinylsulphone and epoxide. When the cross-linking moiety L terminates in an acid reactive group, suitable reaction partners may have as their corresponding reactive group for example isocyanate, aziridine and carbodiimide. Preferred cross-linking/partner combinations of this invention include hydroxyl-isocyanate, amine-isocyanate and acid-carbodiimide.

The cross-linking group or groups may react with one or more reaction partners contained in the discontinuous phase. The reaction partner may contain more than type of functional group, capable of undergoing reaction with the reactive cross-linking groups on the polymeric surfactant. The discontinuous phase may also contain substances that do not react with the cross-linking groups on the surfactant but which themselves are capable of interfacial polymerisation.

The ratio of (a) the reaction partner dissolved in the liquid discontinuous phase and undergoing interfacial reaction to (b) the remainder of the components of the discontinuous phase determines the nature of the resulting interfacial structure. At one extreme the structure may be a flimsy polymer network that maintains the integrity of the discontinuous phase in the formulation but which provides no barrier when separated from the continuous phase. In this instance, after spraying and dry-down the components of the discontinuous phase are immediately released. At another extreme the structure may provide a robust and substantial barrier such as that in microcapsules that slowly releases the components of the discontinuous phase when the formulation is sprayed and dried. The effectiveness of the barrier is a function of a number of factors including the thickness of the barrier, the particle size, the concentration gradient of the substance from the inside to the outside of the capsule and the permeability of the substance through the barrier. It will be apparent to those practised in the art that the effectiveness of the barrier may be widely varied by varying these parameters. The nature of the interfacial material and the degree of cross-linking has a very significant effect. In general however the following guidelines indicate general interfacial structures. At ratios of about 3 wt % and below of interfacial structure (wall) to the discontinuous phase, generally physically weak and poor barriers result. At ratios of about 8 wt % and above substantial barriers may be obtained. Stable emulsions of this invention are made typically with 4wt % and below of interfacial material to discontinuous phase. Microcapsules of this invention are made typically with 10 wt % of interfacial material to the discontinuous phase.

The functionality of the substance dissolved in the discontinuous phase and capable of reacting with the cross-linking groups on the surfactants is suitably equal to or greater than two. The invention is not limited by the structure of the substance provided that the substance is readily soluble in the discontinuous phase and reacts with the cross-linking groups.

Thus for example in one embodiment of this invention, when the discontinuous phase contains isocyanates, the cross-linking groups contain one or more functional groups capable of reacting with isocyanate. These groups may for example be (substituted) amino, hydroxyl, thiol or carboxyl. Hydroxyl and amino groups are preferred. Primary and secondary amino groups are most suitable. Tertiary amino groups may catalyse isocyanate reactions but do not usually form stable reaction products. When more than one functional group X is present the groups may be the same or different. Reactions with isocyanates are illustrated here using generic structures.

Carboxylic groups may be introduced using for example mono-2-(methacryloyloxy)ethyl succinate, acrylic acid, methacrylic acid, beta-carboxyethylacrylic acid, 4-vinylbenzoic acid and itaconic acid. Enhanced adsorption to the oil-water interface may be accomplished by forming the emulsion above the pKa of the acid, i.e., in the salt form, which favors water solubility, and then reducing the pH to below the pKa of the acid, which will reduce water solubility.

Carboxylic acids react with isocyanates to form mixed anhydrides that rapidly eliminate carbon dioxide with the formation of carboxylic amides:

Hydroxyl groups may be introduced using hydroxethyl methacrylate, N-(2-hydroxypropyl)methacrylamide, or poly(ethylene glycol)$_n$ monoethacrylate. Amino groups may be introduced using 2-aminoethyl methacrylate hyrochloride, N-(3-aminopropyl)methacrylamide hydrochloride or 2-(tert-butylamino)ethyl methacrylate. Thiol, hydroxyl and amino groups react with isocyanates to form respectively thiocarbamate, urethane, and urea linkages:

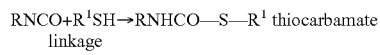

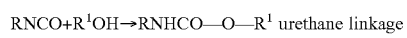

In a further embodiment of the invention, the nature of the cross-linking groups may be altered, or cross-linking groups may be introduced by post-reaction of the copolymer. For example, carboxylic groups may be iminated to make polyimine combs.

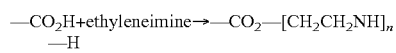

Amine groups react with isocyanates in the manner described above.

The reactivity of the functional group with the isocyanate influences the rate at which the surfactant is bound to the reactants in/on the discontinuous phase. For example, isocyanates typically react much faster with amines than with alcohols or acids.

In a further embodiment of the invention, the polymeric surfactant may contain a cross-linking unit capable of reacting with a coupling agent which is either contained within the discontinuous oil phase or added through the aqueous phase after formation of the oil-in-water emulsion and where the added agent is also capable of reacting with isocyanate in the oil phase. This approach requires that the reactive surfactant is irreversibly bound to the oil interface before addition of the coupling agent.

Multi-functional aziridines such as CX-100 available from Avecia Neo Resins (structural formula shown below, m=3) may be used as a coupling agent when acid monomers are incorporated into the polymeric surfactant. Aziridines react with isocyanates and with carboxy groups in their free acid but not salt forms.

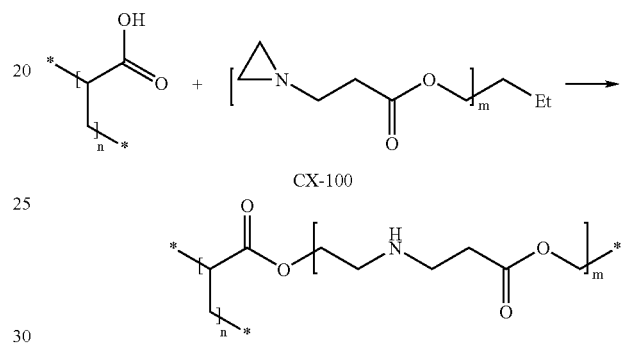

CX-100

Poly(Carbodiimides) such as CX-300 available from Avecia Neo Resins may be used as a coupling agent when acid monomers are used as the cross-linking groups. Reaction between the acid and the carbodiimide is conventionally believed to result in three types of products as illustrated below. The N-acyl urea and urea products are stable while the anhydride may be hydrolysed to two carboxylic acids.

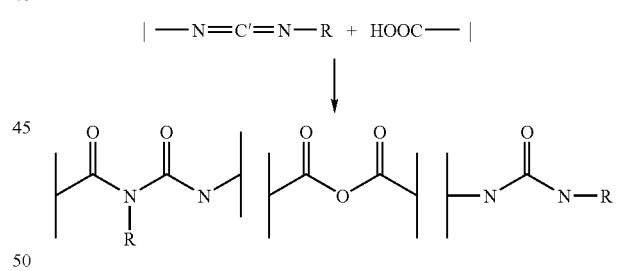

Block copolymers may be prepared by those methods typically used for preparation of such materials today. These tend to involve either living anionic or group transfer polymerization. Preparative conditions for these methods are very demanding, for example, the need for low temperatures, the use of rigorously anhydrous solvents and of extremely pure reagents. In addition, the use of functional monomers often requires employment of protecting group chemistry.

Recently the advent of a new procedure, atom transfer radical polymerisation (ATRP) provides a system allowing control over the block composition and length. This method is tolerant to monomer type [styrene and (meth)-acrylic derivatives], to purity, to the presence of water, and the use of functional monomers often does not require protection/deprotection chemistry.

One system for carrying out ATRP is described by Coca et al in *J Polym Sci: Part A Polym Chem*, Vol 36, 1417–1424 (1998) "ATRP employs a Cu(I) halide, which is complexed with ligands (often bidentate), to form a "CuX/2L" complex. Halogenated initiators are used for polymerisation. The Cu(I) complex reversibly activates dormant polymer chains (and the initiator) by transfer of the halogen end groups as shown in Scheme 1."

Scheme 1

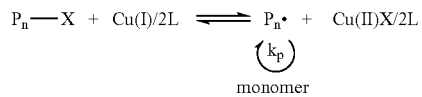

The following structures further illustrat polymers for use in this invention.

FORMULA (V)

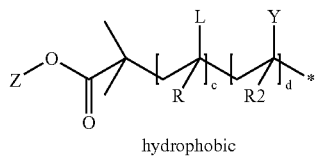

hydrophobic

In formula (V) L, R, $R^2$, Y, c and d have the definitions given previously in respect of the polymer of formula (IV) and Z is a hydrophilic group such as methoxy-PEG. For example the hydrophilic segment containing [Z—OCOCMe$_2$—] may have Z as methoxy-PEG of Mw 350–10000, preferably 350–4000. Polymers of the type illustrated by Formula V are given in Examples 3a and 4b where the hydrophilic segment is provided by a methoxy poly(ethyleneglycol) macroinitiator (ZO$_2$CCMe$_2$—). In example 3a the unit c is MAOES and the unit D is MMA. In example 4b the unit c is HEMA and the unit d is MMA.

The hydrophobic segment containing —[CH$_2$CYR$^2$]— may be single or mixed monomers selected from acrylates ($R^2$=H, Y=—CO$_2$A where A is a C$_1$–C$_{12}$ optionally substituted hydrocarbyl moiety); methacrylates ($R^2$=Me, Y=—CO$_2$A where A is a C$_1$–C$_{12}$ optionally substituted hydrocarbyl moiety); alkyl acrylamides ($R^2$=H or Me, Y=—CONHB where B is a C$_5$–C$_{12}$ alkyl group); styryl ($R^2$=H or Me, Y=phenyl or substituted phenyl).

The cross-linking unit(s) —[CH$_2$CLR]— may be for example single or mixed monomers selected from:—
- amine functional monomers such as 2-aminoethyl methacrylate hyrochloride, N-(3-aminopropyl)methacrylamide hydrochloride, 2-(tert-butylamino)ethyl methacrylate
- hydroxy monomers such as N-(2-hydroxypropyl)methacrylamide, hydroxethyl methacrylate, or poly(ethylene glycol)n monoethacrylate
- carboxylic monomers such as acrylic acid, methacrylic acid, beta-carboxyethylacrylic acid, 4-vinylbenzoic acid, itaconic acid or iminated derivatives of these monomers once polymerised.
- monomers such as glycidyl (meth)acrylate which can be converted to reactive functional groups by reaction with, for example, alkylamines Especially preferred cross-linking units for Formula IV/V include amine functional monomers such as 2-aminoethylmethacrylate; hydroxy monomers such as 2-Hydroxyethyl methacrylate, poly(ethylene glycol)n monoethacrylate, carboxylic monomers such as mono-2-(Methacryloyloxy)ethyl succinate and methacrylic acid;

In the case of some of the above block copolymers the hydrophilic A-block may be introduced from a macro-initiator of defined structure [typically Z—OCOCMe$_2$Br] which is extended with appropriate amounts of hydrophobic (CH$_2$=CR$_2$Y) and cross-linking (CH$_2$=CRL) monomers. Alternatively, or in addition to the above, the initiator (which may not be a macro-initiator) may be chain extended with a hydrophilic monomer (CH$_2$=CR$_1$X) to generate the A-block and thence with appropriate amounts of hydrophobic (CH$_2$=CR$_2$Y) and cross-linking (CH$_2$=CRL) monomers to generate the B-block (or alternatively the groups CH$_2$=CR$_1$X, CH$_2$=CR$_2$Y, and CH$_2$=CRL may be randomly copolymerised to form graft copolymers).

FORMULA (VI)

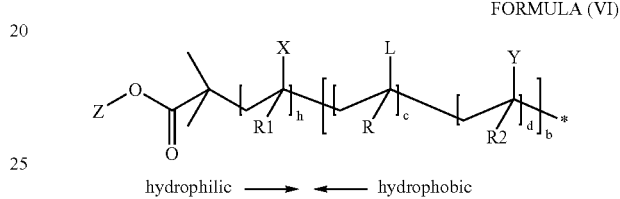

hydrophilic ⟶ ⟵ hydrophobic

The hydrophilic moiety [Z—OCOCMe$_2$–CH$_2$CR$^1$X—] may have Z as a C$_1$–C$_3$ alkyl or methoxy-PEG group.

The vinylic monomers (CH$_2$=CR$_1$X) giving rise to the hydrophilic unit(s) may be single or mixed monomers selected from inter alia methoxy-PEG-(meth)acrylate, acrylamide, vinyl pyrrolidone, 2-sulphoethyl methacrylate, 2-acrylamido-2-methylpropane sulphonic acid, 4-styrene sulphonic acid, quaternary salts of dimethylaminoethyl methacrylate (DMAEMA) and of dimethylaminoethyl acrylate or DMAEMA at acid pHs. Preferred monomers include 2-(trimethylammonium)ethyl methacrylate iodide, 2-(N,N-dimethyl-N-(2-methacryloyethyl)ammonium)ethanoic acid, 3-(N,N-dimethyl-N-(2-methacryloxyethyl)ammonium)propyl-sulphonic acid or styrene-4-sulfonic acid.

The hydrophobic block —[CH$_2$CYR$^2$]— may be single or mixed monomers selected from the above list. The cross-linking unit(s) —[CH$_2$CLR]— may be single or mixed monomers selected from the above list. Optimum total molecular weight and the sizes of the blocks of the surfactants will depend on the nature of the monomers and on the active ingredient employed in the process. Molecular weights in general will range from about 1,000 to about 20,000. Preferred molecular weights are between about 5,000 to about 20,000. The cross-linking groups are incorporated at less than 100% level into the surfactant, preferably from about 2 to about 20 mole % of the hydrophobic b block. The nature of the polymeric surfactant will determine the medium in which it can be made and used. This will range from nonpolar solvents such as xylene through polar solvents such as water. While surfactants having some solubility in both the discontinuous phase and the continuous phase are suitable for use in this invention surfactants which have limited solubility in the bulk continuous phase and which adsorb strongly at the interface of the discontinuous phase are preferred. Hydrophobic monomers described as CH2=CRY units above adhere in general strongly to the discontinuous phase. Methyl methacrylate is suitably hydrophobic, while butyl acylate and styrene are even more hydrophobic.

The polymers for use in this invention provide the introduction of controlled structures that have advantages. Such polymers made by controlled radical polymerisation generally have lower polydispersities than comparable polymers made by conventional radical methods. The control thus minimises the amount of low molecular weight tail. The strength of adsorption of surfactants to an aqueous discontinuous phase depends on the number of hydrophobic units in the surfactant that are available for adsorption. Assuming comparable composition over the molecular weight range higher molecular weight chains will have relatively more such hydrophobic units and will stand to bind more strongly than low molecular weight chains. For the minimum effective ratio of surfactant to discontinuous phase the amount of 'unbound' material in the continuous phase is thus minimised. This then minimises or removes material that could act as carriers for the Ostwald ripening. This approach provides several benefits: (1) The bound surfactant will be difficult to physically strip from the interface of the discontinuous phase, specifically a liquid emulsion droplet or the surface of a microcapsule particle. This greatly improves the efficiency of the surfactant action and enables the preparation of robust formulations. (2) A selected charge within the surfactant polymer may be bound onto the interface of the discontinuous phase. This enables further elaboration, for example, use of the charge to control heteroflocculation. (3) Appropriate functional groups whether charged or otherwise within the bound surfactant could be reacted with a monomer, oligomer or polymer added through the continuous phase. In this way a barrier coating could be introduced onto individual phase that may be a liquid emulsion droplet or a particle such as a microcapsule.

Thus, in preparation of stable emulsions or of microcapsules via the processes mentioned above, the polymer is preferably somewhat soluble or dispersible in the continuous phase, which in most cases is the aqueous phase. In such processes, the oil which for microencapsulation applications contains the material to be encapsulated and the wall-forming material(s) is dispersed in water using the reactive polymers of the present invention. For emulsion applications, the substance capable of reacting with the cross-linking groups will similarly be contained in the oil phase which will generally also contain an active ingredient such as an agrochemical active ingredient which may be dissolved or dispersed in the liquid oil phase. The surfactant is thus in intimate contact with the oil interface. The reactive groups of the surfactant are induced to react with the substance(s) capable of reacting with the cross-linking groups on the surfactant. When these are wall-forming materials, they may be simultaneously or sequentially polymerised to form the microcapsule wall.

The polymers for use in this invention may be utilized as surfactants and/or as protective colloids in interfacial polymerisation processes to form stable emulsions or microcapsules by causing polymerisation (and reaction in some cases) of ingredients contained in the emulsion. In one type of interfacial polymerisation or condensation process, monomers in both the oil and aqueous phases are brought together at the oil/water interface where they react by condensation to form the microcapsule wall. This is described for example in U.S. Pat. No. 4,280,833. In another type of polymerisation reaction, generally termed in situ interfacial condensation, all of the wall forming monomers or prepolymers are contained in the discontinuous phase. This is then dispersed into a continuous phase which contains the surface activations. Usually in these cases the discontinuous phase is an oil or organic phase and the continuous phase is an aqueous phase. However, formation of water/oil emulsions is not uncommon in this type of microencapsulation process. In any case, the discontinuous phase is dispersed as discrete droplets throughout the continuous phase by means of emulsification. An interface is formed between the two phases. In situ condensation of the wall forming materials and curing of the polymers at the interface may be initiated by heating the emulsion and controlling the pH. The surfactants for use in this invention will react with the wall forming materials prior to or during the polymerisation step. The result is a suspension of microcapsules in the continuous phase in which the microcapsules have surfactants of the present invention bound to their surfaces through the cross-linking groups.

In addition to the use in microencapsulation processes, the surfactants for use in this invention are suitable for emulsion stabilization. It is well known in the art that desorption of surfactant from an interface can lead to destabilization of an emulsion. Moreover, it is known that micellisation effects will also lead to redistribution of components throughout the system, which can then lead to Ostwald ripening and other undesirable interactions. The incorporation into the discontinuous phase (usually the oil phase) of a small amount of material that is capable of reacting with the polymeric surfactants of the present invention can result in emulsion stabilization. Reaction of this small amount of material in the discontinuous phase with the surfactants for use in this invention results in emulsion compositions having the inventive surfactants bonded therein at the interface. One advantage provided in such emulsions is a reduction or elimination of foaming due to reduced levels, or no levels, of free surfactant. Other advantages may lie in better control of droplet size and increased long-term stability The invention is illustrated by the following Examples in which all parts and percentages are by weight unless otherwise stated. The following abbreviations are used:

AEMA.HCl: 2-Aminoethyl methacrylate hydrochloride; from Sigma Aldrich.

BMA: n-Butyl methacrylate; from Sigma Aldrich.

CX-300: Poly(carbodiimide) crosslinker; from Avecia NeoResins.

DETA: Diethylene triamine from Sigma-Aldrich

DMAEMA: 2-(Dimethylamino)ethyl methacrylate; from Sigma Aldrich.

QuatDMAEMA (PP): 2-(Trimethylammonium)ethyl methacrylate iodide or chloride where PP indicates that the monomer used was DMAEMA and the quaternisation reaction was carried out post-polymerisation using methyl iodide.

DMMAEA betaine: 2-(N,N-Dimethyl-N-(2-methacryloxyethyl)ammonium)ethanoic acid (prepared via a modification of the literature procedure; L. A. Mkrtchyan et al. Vysokomol. Soedin., Ser. B 1977, 19(3), 214–16.

DMMAPSA betaine: 3-(N,N-Dimethyl-N-(2-methacryloxyethyl)ammonium)propyl-sulphonic acid; from Sigma Aldrich.

HDIT: Hexane-1,6-diisocyanate biuret trimer; Desmodur N3300 from Bayer.

HEMA: 2-Hydroxyethyl methacrylate; from Sigma Aldrich.

NaMAA: Sodium salt of methacrylic acid; from Sigma Aldrich.

MAOES: mono-2-(Methacryloyloxy)ethyl succinate; from Polysciences Inc.

MMA: Methyl methacrylate; from Sigma Aldrich.

PEGMA(#): Mono-methoxy poly(ethylene glycol) mono-methacrylate where # is the average degree of polymerisation of the PEG chain; from Polysciences Inc. or Laporte Performance Chemicals.

PCDI: Poly(carbodiimide); from Sigma-Aldrich

PDMSMA: Poly(dimethylsiloxane) mono-methacrylate with an average molecular weight of 1000.

PMPPI: Poly(methylene)poly(phenylene) isocyanate); Suprasec 5025 from Huntsman.

PPGMA(#)polypropylene glycol) mono-methacrylate, where (#) is the average degree of polymerisation of the PPG chain; from Polysciences Inc or Laporte Performance Chemicals.

SSA: Styrene4-sulfonic acid; from Sigma Aldrich.

TDI: Tolylene diisocyanate (mixture of isomers); from Sigma Aldrich.

Atlas G5000: Poly(ethylene oxide-block-propylene oxide) copolymer; from Uniqema.

GLO5: Poly(vinyl alcohol); Gohsenol from Nippon Gohsei.

LIC 0.1: Alkylated polyfructose surfactant; from Inutec.

Span 80: Oleate sorbitan ester; from Uniqema

Morwet D425: Sodium salt of a sulphonated naphthalene-urea condensation polymer; from Witco.

Solvesso 200: Alkylated naphthalene solvent; from Exxon-Mobile.

s-Metolachlor: (S) 2-chloro-6'-ethyl-N-(2-methoxy-1-methylethyl)acet-o-toluidide.

Fenpropidin: (RS)-1-[3-(4-tert-butylphenyl)-2-methylpropyl]piperidine.

λ-Cyhalothrin: (RS)-α-cyano(3-=phenoxybenzyl) (Z)-(1R)-cis-3-(2-chloro-3,3,3-trifluoropropenyl)-2,2-=dimethyl-cyclopropanecarboxylate.

Tefluthrin; 2,3,5,6-Tetrafluoro-4-methylbenzyl (Z)-(1RS)-cis-3-(2chloro-3,3,3-trifluoroprop-1-enyl)2,2-dimethyl-cyclopropanecarboxylate.

Sigma Aldrich, Gillingham, UK. Polysciences Inc, Warrington, Pa. 18976, USA. Laporte Performance Chemicals, Hythe, UK. Bayer, Leverkusen, Germany. Avecia NeoResins, Waalwijk, Netherlands. Exxon-Mobile, Houston, USA. Witco (Crompton Europe), Slough, UK. Uniqema Crop Protection, Gouda, Netherlands. Nippon Gohsei, Osaka, Japan.

For clarity the structures of the above monomers are given as:

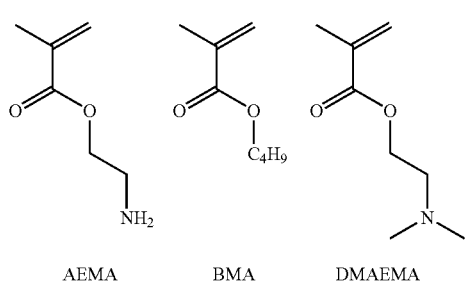

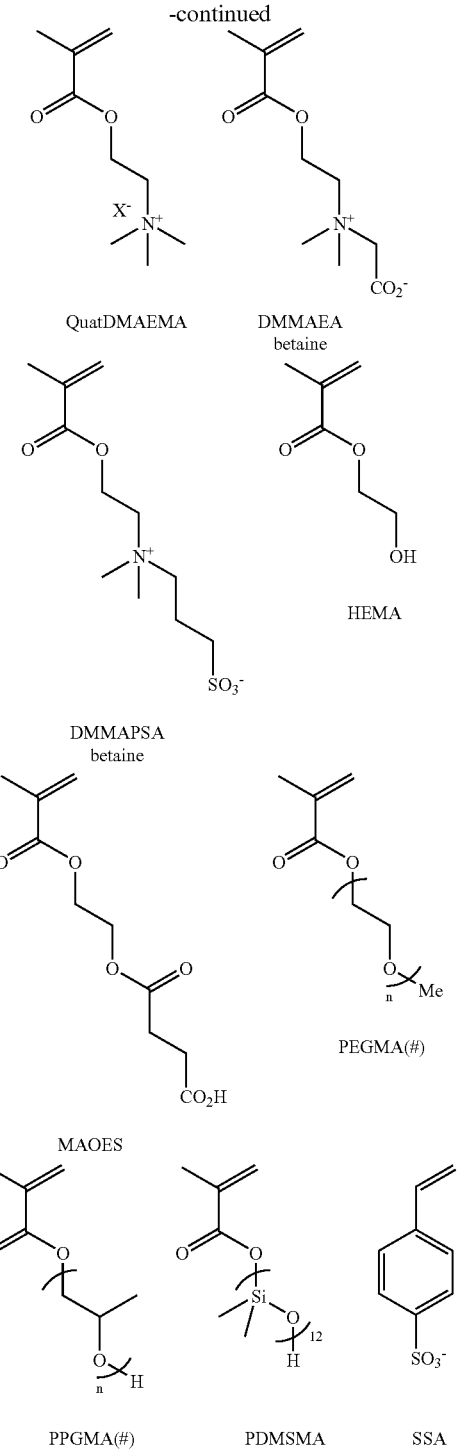

EXAMPLE 1

Synthesis of Reactive Polymeric Surfactants by Atom Transfer Radical Polymerisation (ATRP).

General Synthetic Procedure:

In a typical polymerisation monomers at the required molar ratios were dissolved in a suitable solvent or solvent mixture. Toluene was normally used for reactions where all components were toluene-soluble. Methanol-water mixtures (between 1:1 and 3:1 v/v) were used for mixtures of components such as AEMA.HCl, QuatDMAEMA, SSA, DMMAPSA betaine and DMMAEA betaine that are poorly soluble in organic solvents.

An appropriate initiator was added. For the preparation of non-ionic block co-polymers this was a polymeric macro-initiator such as a mono-2-bromoisobutyryl mono-methoxy poly(ethylene glycol), abbreviated PEG-Br (#), where # is the number of ethylene glycol units, prepared via the literature method (Jankova et al. Macromolecules, 1998, 31, 538–541). For the preparation of graft copolymers or ionic block copolymers the initiator was a monomeric 2-bromoisobutyryl ester, which may be ethyl-2-bromoisobutyrate (EtBiB) or a different monomeric 2-bromoisobutyryl ester (BiB-R). The amount of initiator added was dependant on the target molecular weight for the co-polymer and was calculated from the relationship:

(Moles monomer)/(Moles initiator)=Degree of polymerisation of copolymer

Also added was a ligand for in-situ formation of the copper complex. This was usually 2,2'-bipyridine (BPY) for polymerisations in methanol/water mixtures and N-n-propyl-2-pyridylmethanimine (PPMA), prepared via the literature method (Haddleton et al. Macromolecules, 1997, 30, 2190–2193), for polymerisations in toluene.

The solution was de-oxygenated by sparging with dry nitrogen gas for 15–30 min before addition to a Schlenk tube, previously charged with the appropriate copper (1) salt to form the mediating complex and then flushed with nitrogen. This was normally copper (I) bromide but was sometimes copper (I) chloride. Copper (I) chloride was used if a faster rate of polymerisation was required. The reaction was carried out under nitrogen at a controlled temperature that ranged between 25 and 90° C. for between 3 and 24 hours. The extent of the reaction was measured by $^1$H-NMR spectroscopy. In the case of ionic block copolymers a second monomer or co-monomer mixture was added to form the second block when conversion of the first monomer batch exceeded 80%. On completion, opening the tube to atmosphere quenched the reaction and the polymer solution was purified by one of several techniques:

(i) For a reaction carried out in toluene the polymer solution was diluted with further toluene, cooled and filtered to remove insoluble material. At this stage the polymer solution was optionally passed through a short column of activated basic aluminium oxide before the product was collected by selective precipitation into hexane and dried under vacuum at between 20° C. and 70° C.

(ii) For a reaction carried out in a methanol/water mixture the solvents were removed by freeze-drying or rotary evaporation. The polymer was then dissolved in toluene, THF or dichloromethane and filtered to remove insoluble material before the product was isolated by selective precipitation into hexane and dried under vacuum at between 20° C. and 70 ° C.

(iii) For a reaction requiring the post-polymerisation quaternisation of DMAEMA the reaction solution was diluted with toluene, cooled and filtered to remove insoluble material then the solvent was removed under vacuum. The polymer was dissolved in ThF and 20% molar excess of iodomethane to tertiary amino groups added under dry nitrogen. The solution was stirred under nitrogen at 20 ° C. for between 16 and 20 hours before the polymer was isolated by selective precipitation into hexane. The polymer was then further purified by Soxhlet extraction with hexane for 24 hours followed by drying under vacuum at 50° C.

The above general procedure was used to prepare the polymeric surfactants detailed in Table 1 where:—

Examples 1a to 1g illustrate hydroxyl and hydoxyl plus carboxylic comb copolymers Examples 2a to 2i illustrate amine and amine plus carboxylic comb copolymers Examples 3a to 3c illustrate carboxylic comb copolymers Examples 4a to 4d illustrate hyroxyl containing block copolymers

TABLE 1

Examples of Reactive Polymeric Surfactants.

| Example No | Structure | Monomers/ mole % | | Initiator | ligand | Copper salt | Solvent | Temp. (° C.) | Target $M_n$ (Da) |
|---|---|---|---|---|---|---|---|---|---|
| Hydroxyl containing comb copolymer surfactants | | | | | | | | | |
| 1a | Cationic/ non-ionic comb | MMA HEMA QuatDMAEMA (PP) PEGMA(23) | 73.5 10 10 6.5 | EtBiB | PPMA | CuCl | Toluene | 70 | 20000 |
| 1b | Cationic/ non-ionic comb | MMA HEMA QuatDMAEMA PEGMA(39) | 60 24 6 10 | BiB-R | BPY | CuBr | Methanol 75% Water 25% | 20 | 16000 |
| 1c | Zwitterionic/ non-ionic comb | MMA HEMA DMMAPSA betaine PEGMA(39) | 60 24 6 10 | BiB-R | BPY | CuBr | Methanol 75% Water 25% | 20 | 16000 |
| 1d | Anionic/non-ionic comb | MMA HEMA SSA PEGMA(39) | 60 24 6 10 | BiB-R | BPY | CuBr | Methanol 75% Water 25% | 20 | 16000 |
| 1e | Anionic/non-ionic comb | MMA HEMA NaMAA PEGMA(39) | 60 24 6 10 | BiB-R | BPY | CuBr | Methanol 75% Water 25% | 20 | 16000 |

TABLE 1-continued

Examples of Reactive Polymeric Surfactants.

| Example No | Structure | Monomers/mole % | | Initiator | ligand | Copper salt | Solvent | Temp. (° C.) | Target $M_n$ (Da) |
|---|---|---|---|---|---|---|---|---|---|
| 1f | Anionic/non-ionic comb | PDMSMA<br>HEMA<br>SSA<br>PEGMA(39) | 13<br>53<br>13<br>21 | BiB-R | BPY | CuBr | Methanol 75%<br>Water 25% | 20 | 16000 |
| 1g | Anionic/non-ionic comb | MMA<br>BMA<br>HEMA<br>SSA<br>PEGMA (39) | 40<br>20<br>24<br>6<br>10 | BiB-R | BPY | CuBr | Methanol 75%<br>Water 35% | 20 | 1600 |
| Amine containing comb copolymer surfactants | | | | | | | | | |
| 2a | Non-ionic comb | MMA<br>AEMA.HCl<br>PEGMA (9) | 71<br>10<br>19 | EtBiB | BPY | CuBr | Methanol 65%<br>Water 35% | 50 | 20000 |
| 2b | Cationic/non-ionic comb | MMA<br>AEMA.HCl<br>QuatDMAEMA<br>PEGMA(39) | 60<br>24<br>6<br>10 | BiB-R | BPY | CuBr | Methanol 75%<br>Water 25% | 20 | 16000 |
| 2c | Cationic/non-ionic comb | MMA<br>AEMA.HCl<br>QuatDMAEMA<br>PEGMA(23) | 65<br>15<br>10<br>10 | EtBiB | BPY | CuBr | Methanol 65%<br>Water 35% | 50 | 20000 |
| 2d | Zwitterionic/non-ionic comb | MMA<br>AEMA.HCl<br>DMMAPSA betaine<br>PEGMA(39) | 60<br>24<br>6<br>10 | BiB-R | BPY | CuBr | Methanol 75%<br>Water 25% | 20 | 16000 |
| 2e | Anionic/non-ionic comb | MMA<br>AEMA.HCl<br>MAOES<br>PEGMA(23) | 74.7<br>8.3<br>11.4<br>5.6 | EtBiB | BPY | CuCl | Methanol 60%<br>Water 40% | 50 | 22000 |
| 2f | Anionic/non-ionic comb | MMA<br>AEMA.HCl<br>MAOES<br>PEGMA(23) | 65<br>13<br>12<br>10 | EtBiB | BPY | CuBr | Methanol 65%<br>Water 35% | 50 | 20000 |
| 2g | Anionic/non-ionic comb | MMA<br>AEMA.HCl<br>NaMAA<br>PEGMA(39) | 60<br>24<br>6<br>10 | BiB-R | BPY | CuBr | Methanol 75%<br>Water 25% | 20 | 16000 |
| 2h | Anionic/non-ionic comb | MMA<br>AEMA.HCl<br>SSA<br>PEGMA(39) | 60<br>24<br>6<br>10 | BiB-R | BPY | CuBr | Methanol 55%<br>Water 45% | 20 | 16000 |
| 2i | Anionic/non-ionic comb | MMA<br>AEMA.HCl<br>SSA<br>PEGMA(39) | 54<br>24<br>12<br>10 | BiB-R | BPY | CuBr | Methanol 65%<br>Water 35% | 20 | 16000 |
| Carboxylic acid containing block and comb copolymer surfactants | | | | | | | | | |
| 3a | Non-ionic diblock | MMA<br>MAOES | 80<br>20 | PEG-Br (45) | PPMA | CuCl | Toluene | 90 | 6000 |
| 3b | Non-ionic comb | MMA<br>MAOES<br>PEGMA(9) | 75<br>10<br>15 | EtBiB | PPMA | CuCl | Toluene | 70 | 20000 |
| 3c | Anionic/non-ionic comb | MMA<br>NaMAA<br>SSA<br>PEGMA(39) | 60<br>24<br>6<br>10 | BiB-R | BPY | CuBr | Methanol 55%<br>Water 45% | 20 | 16000 |
| Hydroxyl containing block and comb copolymer surfactants | | | | | | | | | |
| 4a | Zwitterionic/non-ionic comb | MMA<br>DMMAEA betaine<br>PEGMA(39) | 58<br>32<br>10 | BiB-R | BPY | CuBr | Methanol 75%<br>Water 25% | 20 | 16000 |
| 4b | Non-ionic diblock | MMA<br>HEMA | 90<br>10 | PEG-Br (45) | PPMA | CuBr | Toluene | 90 | 4000 |
| 4c | Non-ionic comb | PPGMA(6.5)<br>PEGMA(39) | 83<br>17 | PEG-Br (7) | BPY | CuBr | Methanol 75%<br>Water 25% | 20 | 21000 |

TABLE 1-continued

Examples of Reactive Polymeric Surfactants.

| Example No | Structure | Monomers/mole % | | Initiator | ligand | Copper salt | Solvent | Temp. (° C.) | Target $M_n$ (Da) |
|---|---|---|---|---|---|---|---|---|---|
| 4d | Cationic diblock | MMA<br>HEMA<br>QuatDMAEMA (PP) | 90<br>10<br>100[b] | EtBiB | PPMA | CuCl | Toluene | 90 | 7000 |

In Table I, column 2 ("Structure"), the detail is as follows:

(i) Non-ionic diblock refers to an AB block copolymer in which one block is mono-methoxypoly(ethylene glycol) and the second block is a methacrylic co-polymer containing the latent reactive groups;

(ii) Non-ionic comb refers to a comb co-polymer in which the pendant chains are mono-methoxypoly(ethylene glycol) and the backbone is a methacrylic co-polymer containing the latent reactive groups;

(iii) Anionic/non-ionic, cationic/non-ionic and zwitterionic/non-ionic comb refers to a comb copolymers in which the pendant chains are mono-methoxypoly(ethylene glycol) and the backbones are methacrylic copolymers containing latent reactive groups and monomer units that are anionic, cationic or zwitterionic at the relevant pH.

Note that in Example 4d DMAEMA was added to grow the second block after the first co-monomer mix had reached high conversion and the tertiary amine groups subsequently quaternised with methyl iodide.

EXAMPLES 5a–6l

The following examples serve to demonstrate that the reactive polymeric surfactants of the present invention can be cross-linked at an oil/water interface using isocyanates and carbodiimides to prepare stable emulsions.

EXAMPLES 5a–5k

Isocyanate Method

Reactive polymeric surfactants containing amino groups were used to emulsify a water immiscible phase containing a small amount of a hydrophobic, multifunctional isocyanate such as PMPPI or HDIT. If necessary, the emulsion was adjusted to pH 7–9 and then stirred for 1–24 hours at between 20° C. and 50° C. for cross-linking to occur.

EXAMPLES 6a–6l

Carbodiimide Method

Reactive polymeric surfactants containing carboxylic acid groups were used, above pH 7, to emulsify a water immiscible phase containing a small amount of a multifunctional carbodiimide such as CX-300 or PCDI. The emulsion was adjusted to pH<3 and the stirred for 1–24 hours at 20° C. for cross-linking to occur.

Emulsification was performed using a rotor-stator high shear mixing apparatus such as those made by Silverson and Ystral. The droplet size of the emulsion did not significantly change during the cross-linking reaction. When viewed by light microscopy it was possible to see surface texture on the emulsion droplets, some of which had become non-spherical. Depending on the quantities used of cross-linker and the reactive polymeric surfactant most emulsion droplets coalesced on drying in a similar fashion to that by an emulsion prepared without cross-linked surfactants.

Details are shown in Table 2.

TABLE 2

| Polymeric Surfactant (RPS) | | | | Internal phase volume (%) | RPS (% w/w to oil) | Crosslinker (% w/w to oil) | Vol. median particle size/μm | |
|---|---|---|---|---|---|---|---|---|
| Example No | Example. | Crosslinker | Internal phase | | | | EW | X-linked |
| 2g | 5a | PMPPI | Solvesso 200 | 50 | 4 | 4 | 4.2 | 4.1 |
| 2f | 5b | PMPPI | Solvesso 200 | 50 | 4 | 4 | 3.9 | 3.8 |
| 2f | 5c | PMPPI | Solvesso 200 | 50 | 2 | 4 | 4.5 | 4.8 |
| 2f | 5d | PMPPI | Solvesso 200 | 50 | 1 | 4 | 5.1 | 5.5 |
| 2f | 5e | PMPPI | s-Metolachlor | 50 | 4 | 4 | 7.3 | 7.3 |
| 2f | 5f | PMPPI | s-Metolachlor | 50 | 1 | 4 | 6.9 | 7.2 |
| 2f | 5g | HDIT | Fenpropidin | 50 | 4 | 4 | 8.1 | 8.0 |
| 2f | 5h | HDIT | Fenpropidin | 50 | 4 | 2 | 9.9 | 9.7 |
| 2f | 5i | HDIT | Fenpropidin | 50 | 2 | 4 | 9.7 | 9.8 |
| 2f | 5j | HDIT | Fenpropidin | 50 | 2 | 2 | 9.7 | 10.1 |
| 2f | 5k | HDIT | Fenpropidin | 50 | 1 | 1 | 17.7 | 17.9 |
| 3a | 6a | CX 300 | Solvesso 200 | 40 | 4 | 2 | 5.4 | 5.4 |
| 3b | 6b | CX 300 | Solvesso 200 | 40 | 4 | 2 | 5.7 | 6.2 |
| 3b | 6c | CX 300 | Solvesso 200 | 40 | 4 | 4 | 4.1 | 4.6 |
| 2g | 6d | CX 300 | Solvesso 200 | 40 | 4 | 2 | 5.7 | 5.8 |

TABLE 2-continued

| Polymeric Surfactant (RPS) Example No | Example. | Crosslinker | Internal phase | Internal phase volume (%) | RPS (% w/w to oil) | Crosslinker (% w/w to oil) | Vol. median particle size/μm | |
|---|---|---|---|---|---|---|---|---|
| | | | | | | | EW | X-linked |
| 1e | 6e | CX 300 | Solvesso 200 | 50 | 4 | 4 | 3.3 | 3.2 |
| 2g | 6f | CX 300 | Solvesso 200 | 50 | 4 | 4 | 3.7 | 3.6 |
| 2f | 6g | CX 300 | Solvesso 200 | 50 | 4 | 4 | 4.2 | 4.0 |
| 2f | 6h | CX 300 | Solvesso 200 | 50 | 2 | 4 | 4.9 | 4.7 |
| 2f | 6i | CX 300 | Solvesso 200 | 50 | 1 | 4 | 5.3 | 5.5 |
| 2f | 6j | CX 300 | s-Metolachlor | 50 | 4 | 4 | 7.4 | 7.3 |
| 2f | 6k | CX 300 | s-Metolachlor | 50 | 1 | 4 | 3.6 | 4.0 |
| 2f | 6l | CX 300 | λ-cyhalothrin/ solvesso 200 (1:1) | 50 | 1 | 2 | 7.8 | 8.1 |

EXAMPLE 7

Examples 7 and 8 illustrate that emulsions using the cross-linked polymers of the present invention are more resilient to coalescence when flocculated than emulsions where the surfactants are not cross-linked and in some cases may be redispersed to their original state.

An aqueous emulsion at pH above 7 at a 50% internal phase volume was prepared from s-metolachlor mixed with 2% CX-300, using the polymeric surfactant of Example 2f at 1% w/w to the oil phase. The polymer was cross-linked by decreasing the pH of the emulsion to below 3 and stirring for 3 hours at 20° C. This emulsion was compared to control samples that were made with the same polymeric surfactant that was not cross-linked, and with Atlas G5000 or GLO5 at the same surfactant level as used in the first emulsion.

The emulsions were diluted to 5% internal phase volume in sodium sulphate solution to give 0.7 molesL$^{-1}$ salt in the continuous phase. After standing for 30 minutes all the emulsions had flocculated. The emulsions made with cross-linked polymer of the invention, Altlas G5000 and GLO5 had sedimented as flocculated droplets while the emulsion made with the corresponding polymer and not cross-linked had sedimented and started to coalesce. For each sample the serum above the sediment was removed and replaced with deionised water to simulate dilution into a large excess of water. The samples were then shaken vigorously by hand for 1 minute and the emulsions assessed by light microscopy. The emulsion made with corresponding polymer and not cross-linked did not re-emulsify after coalescence and the emulsion made with GLO5 did not de-flocculate satisfactorily. The emulsions made with Atlas G5000 had undergone a significant increase in droplet size and was still partially flocculated. In contrast the emulsion made with cross-linked polymer according to the invention re-dispersed cleanly and had not undergone a significant change in droplet size.

EXAMPLE 8

An aqueous emulsion at pH above 7 at a 50% internal phase volume was prepared from a solution of lambda-cyhalothrin and Solvesso 200 (1:1) mixed with 1% CX-300, using the polymeric surfactant of Example 2f at 1% w/w to the oil phase.

The polymeric surfactant was cross-linked by decreasing the pH of the emulsion to below 3 and stirring for 3 hours at 20° C. This emulsion was compared to control samples that were made with the same polymeric surfactant that was not cross-linked, and with Atlas G5000 or GLO5 at the same surfactant level as used in the first emulsion.

The emulsions were diluted to 5% internal phase volume in sodium sulphate solution to give 0.1 molesL$^{-1}$ salt in the continuous phase and heated to 50° C. for 30 min without agitation after which time all the emulsions had flocculated. The emulsions made with the cross-linked polymeric surfactant according to the invention, Altlas G5000 and GLO5 had sedimented as flocculated droplets while the emulsion made with the corresponding polymeric surfactant and not cross-linked had sedimented and started to coalesce. For each sample the serum above the sediment was removed and replaced with deionised water to simulate dilution into a large excess of water. The samples were then shaken vigorously by hand for 1 minute and the emulsions assessed by light microscopy. The emulsion made with the corresponding polymeric surfactant and not cross-linked did not re-emulsify after coalescence and the emulsions made with Atlas G5000 and GLOS did not de-flocculate satisfactorily. In contrast the emulsion made with cross-linked polymeric surfactant according to the invention had begun to redisperse and required a further 10 minutes shaking to redisperse the droplets. The emulsion had not undergone a significant change in droplet size.

EXAMPLE 9

Examples 9 and 10 demonstrate that emulsions using the cross-linked polymers according to the present invention are beneficial in formulating suspo-emulsions due to enhanced stability and reduced number of different surfactants needed compared with emulsions where the surfactants are not cross-linked.

An aqueous emulsion at a 50% internal phase volume was prepared from fenpropidin mixed with 1% w/w HDIT using the polymeric surfactant of Example 2f at 1% w/w to the oil phase. The polymeric surfactant was cross-linked by stirring the emulsion at 50° C. for 3 hours. A mixture of the cross-linked polymeric surfactant emulsion with a suspension concentrate of picoxystrobin (dispersed with Morwet D425) was prepared to give a 25% w/w fenpropidin—10% w/w picoxystrobin suspo-emulsion. This formulation showed no signs of picoxystrobin crystal growth during 14 days of temperature cycled (20–40° C.) storage compared with a similar suspo-emulsion in which the fenpropidin was emulsified with LIC 0.1 and Span 80 where the picoxystrobin particles grew from irregular, milled particles to large, plate-like crystals during 14 days of temperature cycled storage.

EXAMPLE 10

An aqueous emulsion at pH below 7 at a 50% internal phase volume was prepared from a metolachlor product consisting of 88% s-metolachlor and 12% metolachlor mixed with 1% CX-300, using the polymeric surfactant of Example 2f at 4% w/w to the oil phase. The polymeric surfactant was cross-linked by decreasing the pH of the emulsion to below 3 and stirring for 3 hours at 20° C.

The emulsion was mixed with a suspension concentrate of copper-mesotrione, that had been dispersed with the same polymeric surfactant used for the emulsion, to give a 20% w/w copper-mesotrione—25% w/w s-metolachlor suspoemulsion. This suspo-emulsion was shaken for 12 hours with no change in stability compared with similar suspoemulsions formulated with emulsions made with uncrosslinked surfactants that exhibited significant heteroflocculation of the s-metolachlor and copper-mesotrione particles.

EXAMPLES 11a to 11az

The following examples serve to demonstrate that the reactive polymeric surfactants of the present invention can be used in the preparation of polyurea microcapsules using the in situ and two-phase processes described below. Details are given in Table 3.

Preparation of the Emulsion:

For either the in situ or two-phase processes the first step was the preparation of an emulsion consisting of a hydrophobic oil phase, typically at an internal phase volume of between 25 and 50%. The internal phase contained 10% w/w of a mixture of TDI and PMPPI, at predetermined weights ratios between 3:1 and 1:1. The organic phase was mixed under high shear using a Silverson or Ystral mixer into an aqueous phase consisting of typically 1–4% w/w to internal phase of reactive polymeric surfactant dissolved in deionised water.

Preparation of Microcapsules:

Microcapsules were then prepared from the emulsion by either the in situ or two-phase process:

In situ Process:

The emulsion was heated to 50 ° C. for approximately 3 hours, with gentle agitation that was provided either by a paddle stirrer or by spinning of the vessel. A proportion of the isocyanate groups were hydrolysed at the emulsion oil-water interface to generate amine groups that reacted rapidly with unhydrolysed isocyanate to form microcapsule walls.

Two-Phase Process:

A 10% w/w aqueous solution of diethylene triamine (DETA) was added drop wise to the emulsion at room temperature with gentle agitation. The quantity of DETA added corresponded to an equimolar number of amine groups to isocyanate groups. The DETA diffused through the aqueous phase to the oil droplets where it reacted at the interface with isocyanate groups to form microcapsule walls.

TABLE 3

Details of microcapsules prepared using polymeric surfactants according to the invention

| Reactive group | Polymeric surfactant (PS) of Example No | Example | Process | Volume median PSD/μm EW | Volume median PSD/μm CS | Internal Phase (% w/w) | PS (% w/w) to oil) | TDI:PMPPI | Observations |
|---|---|---|---|---|---|---|---|---|---|
| HEMA | 1a | 11a | Two-phase | 7.5 | | 40 | 4 | 3:1 | Unflocc'd, strong caps |
| HEMA | 1a | 11b | In-situ | 4.6 | 9.3 | 25 | 4 | 3:1 | Mod. flocc'd, strong caps |
| HEMA | 1b | 11c | Two-phase | 4.0 | 4.5 | 25 | 4 | 3:1 | Unflocc'd, strong caps |
| HEMA | 1c | 11d | Two-phase | 3.8 | 4.2 | 25 | 4 | 3:1 | Unflocc'd, strong caps |
| HEMA | 1d | 11e | Two-phase | 3.7 | 4.0 | 25 | 4 | 3:1 | Unflocc'd, strong caps |
| HEMA | 1e | 11f | Two-phase | 10.1 | 10.3 | 25 | 4 | 3:1 | Mod. flocc'd, strong caps |
| HEMA | 1f | 11g | In-situ | 6.6 | 6.6 | 25 | 4 | 3:1 | Unflocc'd caps |
| HEMA | 1f | 11h | Two-phase | 6.6 | 6.7 | 25 | 4 | 3:1 | Unflocc'd, strong caps |
| HEMA | 4d | 11i | In-situ | 0.4 | 0.5 | 40[c] | 4 | 1:3 | Unflocc'd, strong caps |
| HEMA | 4d | 11j | In-situ | 8.4 | 8.3 | 40 | 4 | 0:1 | Unflocc'd, strong caps |
| HEMA | 4d | 11k | Two-phase | 8.4 | 8.4 | 40 | 4 | 0:1 | Unflocc'd, strong caps |
| HEMA | 4d | 11l | In-situ | 14.5 | 14.5 | 25[b] | 4 | 1:1 | Unflocc'd, strong caps |
| AEMA | 2b | 11m | Two-phase | 5.7 | 6.0 | 25 | 4 | 3:1 | Unflocc'd, strong caps |
| AEMA | 2c | 11n | Two-phase | 6.4 | 6.2 | 40 | 4 | 0:1 | 10% w/w λ-cyhalothrin Unflocc'd, strong caps |
| AEMA | 2c | 11o | Two-phase | 0.4 | 0.4 | 40 | 6 | 0:1 | 10% w/w λ-cyhalothrin Unflocc'd, strong caps |
| AEMA | 2d | 11p | In-situ | 5.7 | 7.1 | 25 | 4 | 3:1 | Unflocc'd caps |
| AEMA | 2d | 11q | Two-phase | 5.7 | 5.8 | 25 | 4 | 3:1 | Unflocc'd, strong caps |

TABLE 3-continued

Details of microcapsules prepared using polymeric surfactants according to the invention

| Reactive group | Polymeric surfactant (PS) of Example No | Example | Process | Volume median PSD/μm EW | Volume median PSD/μm CS | Internal Phase (% w/w) | PS (% w/w to oil) | TDI:PMPPI | Observations |
|---|---|---|---|---|---|---|---|---|---|
| AEMA | 2e | 11r | Two-phase | 5.7 | | 25 | 4 | 3:1 | Unflocc'd, strong caps |
| AEMA | 2e | 11s | Two-phase | | | 25 | 4 | 0:1 | Unflocc'd, strong caps |
| AEMA | 2e | 11t | Two-phase | 4.3 | 4.2 | 40 | 4 | 0:1 | 10% w/w λ-cyhalothrin Unflocc'd, strong caps |
| AEMA | 2e | 11u | Two-phase | 0.4 | 0.5 | 40 | 6 | 0:1 | 10% w/w λ-cyhalothrin Unflocc'd, strong caps |
| AEMA | 2g | 11v | Two-phase | | | 25 | 4 | 0:1 | Unflocc'd, strong caps |
| AEMA | 2h | 11w | Two-phase | 4.7 | 4.9 | 25 | 4 | 3:1 | Unflocc'd, strong caps |
| AEMA | 2i | 11x | In-situ | 6.5 | 6.4 | 25 | 4 | 3:1 | Unflocc'd, strong caps |
| AEMA | 2i | 11y | Two-phase | 6.5 | 6.1 | 25 | 4 | 3:1 | Unflocc'd, strong caps |
| AEMA | 2i | 11z | In-situ | 5.1 | 5.2 | 40 | 4 | 3:1 | Unflocc'd caps |

In the "Observations" column of Table 3:
(i) "Unflocc'd" (Unflocculated) describes a capsule suspension where less than 1% of the capsules are judged to be flocculated when viewed by light microscopy and moderately flocculated describes a capsule suspension where less than 50% of the capsules are flocculated and the flocculated clusters contain no more than 20 capsules. (ii) "Strong caps" describe microcapsules that retain their shape without deformation or rupturing when a sample of the suspension is dried in air at room temperature.

Note (b) that in Example 11l, the internal phase was a 63% w/w solution of λ-cyhalothrin in Solvesso 200.

Note (c) that in Example 11i, the internal phase was a 63% w/w solution of Tefluthrin in Solvesso 200.

What is claimed is:

1. A process for the production of an oil-in-water emulsion having an oil discontinuous phase and an aqueous continuous phase, said process comprising:
   (i) reacting a polymeric stabiliser of formula (I)

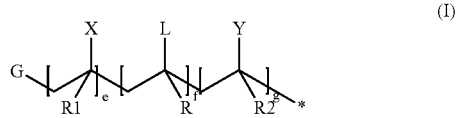

(I)

said stabiliser being a random graft copolymer or a block copolymer and including a plurality of vinylic monomers, not being exclusively of vinylic esters or of their hydrolysed products and being soluble or dispersible in the aqueous continuous phase wherein:

G is a group * or "Hydrophile";
"Hydrophile" is the residue of a hydrophilic initiator group;
R, R1, and R2 are independently H or methyl;
X is a hydrophilic moiety;
L is a moiety containing a cross-linking group capable of undergoing a cross-linking nucleophilic or condensation reaction at the interface of the discontinuous and continuous phases of said emulsion, wherein said cross-linking group is selected from —SH, —OH and —NHA where A is hydrogen or $C_1$–$C_4$ alkyl; and —COOH or a salt thereof;

Y is a hydrophobic moiety;
e is from 0.005 to 0.33;
f is from 0.05 to 0.4; and
g is from 0.1 to 0.9; with (ii) one or more substances dissolved in the liquid discontinuous oil phase and which react with said cross-linking group.

2. A process according to claim 1 wherein:
(i) R1 is hydrogen or methyl and X carries a hydrophilic moiety selected from —$SO_3^-$; polyethylene glycol optionally end-capped with C1–C4 alkyl; —COOH and a salt thereof; carboxybetaine; sulfobetaine; a quaternary ammonium salt —$N^+R^3_3C^-$ where $R^3$ is H or C1–C4 alkyl; and —$CH_2CH_2OH$; or R1 is hydrogen and X is phenyl substituted with a hydrophilic moiety selected from —$SO_3^-$; polyethylene glycol optionally end-capped with C1–C4 alkyl; —COOH and a salt thereof; carboxybetaine; sulfobetaine; a quaternary ammonium salt —$N^+R^3_3C^{31}$ where $R^3$ is H or C1–C4 alkyl; and —$CH_2CH_2OH$;

(ii) R is hydrogen or methyl and L carries a cross-linking group selected from —OH; —NHA where A is hydrogen or $C_1$–$C_4$ alkyl; and —COOH and a salt thereof; or R is hydrogen and X is phenyl substituted with a cross-lining group selected from —OH; —NHA where A is hydrogen or $C_1$–$C_4$ alkyl; and —COOH and a salt thereof; and (iii) R2 is hydrogen or methyl; and Y carries a hydrophobic moiety selected from the group consisting of:
—CO—O—(—Si($CH_3$)$_2$O—)$_n$ wherein n is from 3 to 20; —CO—O-polypropylene glycol;
—CO—O—A wherein A is a $C_1$–$C_{12}$ alkyl group, cycloaklyl group, alkylcycloalkyl group, aralkyl group or alkylaryl group; and
—CONHB wherein B is a $C_5$–$C_{12}$ alkyl group; or R2 is hydrogen and X is phenyl substituted with a hydrophobic moiety selected from the group consisting of:

—CO—O—(—Si(CH₃)₂O—)ₙ wherein n is from 3 to 20; —CO—O-polypropylene glycol;

—CO—O—A wherein A is a $C_1$–$C_{12}$ alkyl group, cycloaklyl group, alkylcycloalkyl group, aralkyl group or alkylaryl group; and —CONHB wherein B is a $C_5$–$C_{12}$ alkyl group.

3. A process according to claim 2 wherein:

(i) the group

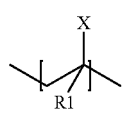

of said polymeric stabiliser is derived from one or more monomers selected from 2-(N,N-dimethyl-N-(2-methacryloxyethyl) ammonium)ethanoic acid, 2-(trimethylammonium)ethyl methacrylate salt, 3-(N,N-dimethyl-N-(2-methacryloxyethyl) ammonium)propyl-sulphonic acid, the sodium salt of methacrylic acid, mono-2-(methacryloyloxy) ethyl succinate, mono-methoxy poly(ethylene glycol) mono-methacrylate, styrene-4-sulfonic acid, 4-vinylbenzyl trimethyl ammonium chloride, 2-N-morpholinoethyl, 2-methacryloxyethylphosphonate methacrylate and 2-acrylamido-2-methylpropane sulphonic acid;

(ii) the group

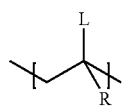

of said polymeric stabiliser is derived from one or more monomers selected from 2-aminoethyl methacrylate, 2-hydroxyethyl methacrylate, the sodium salt of methacrylic acid, mono-2-(methacryloyloxy)ethyl succinate, poly(propylene glycol) mono-methacrylate, 2-methoxy-4-vinylphenol, 4-vinylbenzyl alcohol, 4-vinylphenol, 2,6-dihydroxymethyl-4-methoxystyrene, 3,5-dimethoxy-4-hydroxystyrene, 2-hydroxy-3-methacryloxypropyl trimethyl ammonium chloride, 3-chloro-2-hydroxypropyl methacrylate, 3-hydroxypropyl methacrylate, 2-hydroxy-3-phenoxypropyl methacrylate, diethylene glycol mono-methacrylate, 2,3-dihydroxypropyl methacrylate, 2-methacryloxyethyl glucoside, sorbitol methacrylate, caprolactone 2-methacryloxyethyl ester, 4-hydroxybutyl methacrylate, 2-hydroxypropyl methacrylate, 4-aminostyrene, 2-(iso-propylamino)ethylstyrene, 4-N-(vinylbenzyl)aminobutyric acid, 3-(N-styrylmethyl-2-aminoethylamino)-propyltrimethyoxysilane hydrochloride, N-(3-methacryloxy-2-hydroxypropyl)-3-aminopropyltriethoxysilane, 4-vinylbenzoic acid, 4-((3-methacryloxy)propoxy)benzoic acid and mono-(2-(methacryloxy)ethyl)phthalate; and (iii) the group

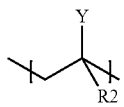

of said polymeric stabiliser is derived from one or more of the following monomers: methyl methacrylate, poly(dimethylsiloxane)mono-methacrylate, mono-methoxypoly(propylene glycol) mono-methacrylate, vinyl esters, vinyl halogens, styrene and optionally substituted styrenes.

4. A process according to claim 1 wherein (a) when the cross-linking group in the moiety L is hydroxyl or thiol, the substance (ii) which reacts with the functional groups is di- or higher functional and is an isocyanate, ester or epoxide; or (b) when the cross linking group in the moiety L is amine, the substance (ii) which reacts with the functional groups is di- or higher functional and is an isocyanate, acetoacetoxy, aldehyde, acrylate, vinylsulphone or epoxide.

5. A process according to claim 4 wherein the isocyanate is selected from tolylene diisocyanate and isomers thereof, phenylene diisocyanate and isomers thereof, biphenylene diisocyanates and isomers and derivatives thereof, polymethylenepolyphenyleneisocyanates, hexamethylene diisocyanate and trimers thereof and isophoronediisocyanate.

6. A process according to any of claim 1 wherein the substance (ii) dissolved in the liquid discontinuous phase is a monomer or pre-polymer capable of undergoing reaction to form a microcapsule shell wall.

7. A process according to claim 6 wherein the monomer or pre-polymer is selected from aromatic diisocyanates, aromatic polyisocyanates and optionally etherified urea-formaldehyde pre-polymers.

8. A process according to claim 1 wherein the polymeric stabiliser is from 0.5 to 8 percent by weight of the discontinuous phase that it stabilises.

9. A process according to claim 8 wherein the polymeric stabiliser is from 1 to 4 percent by weight of the discontinuous phase that it stabilises.

10. A process according claim 1 wherein the liquid discontinuous phase has an agrochemical active ingredient dissolved or dispersed therein.

11. A process according to claim 10 wherein the emulsion is a suspoemulsion containing a first agrochemical active ingredient in admixture with an aqueous suspension of a second agrochemical.

12. A process according to claim 1 wherein the polymeric stabiliser is a random graft copolymer and has the formula

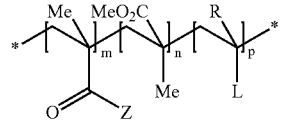

wherein R is hydrogen or methyl; Z is a hydrophilic group; L is a cross-linking group as defined in claim 1; m has a value of from 0.05 to 0.30; n has a value of from 0.50 to 0.80; and p has a value of from 0.02 to 0.20.

13. A process according to claim 12 in which (i) Z is methoxy-PEG in which PEG stands for a number of ethylene oxide units $(C_2H_4O)_q$ in which q has a value of from 5 to 40; or (ii) Z is moiety containing a sulphonate group; or (iii) Z is —O$^-$M$^+$ where M is a Group I metal or a $C_1$–$C_3$ quaternary ammonium salt; or (iv) Z is a betaine group —OCH$_2$CH$_2$N$^+$Me$_2$CH$_2$CO$_2$$^-$ or —OCH$_2$CH$_2$N$^-$Me$_2$(CH$_2$)$_3$SO$_3$$^-$; or (v) Z is —OCH$_2$CH$_2$OCOCH$_2$CH$_2$CO$_2$H; or (vi) Z is —OCH$_2$CH$_2$N$^-$R$_3$X where R3 is C1–C4 alkyl or —CH2CH2OH and X is halide or sulphate.

14. A process according to claim 12 wherein L is —CO2CH2CH2OH and R is hydrogen or methyl.

15. A process according to any one of claim 1 wherein the polymeric stabiliser is a block copolymer.

16. A process according to claim 15 wherein the polymeric stabiliser unit

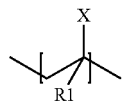

includes moieties selected from poly(ethylene oxide), poly(acrylamide), poly(vinyl pyrrolidone), poly(methylvinylether), acrylic acid, methacrylic acid, beta-carboxyethylacrylic acid, 4-vinylbenzoic acid, itaconic acid, vinyl sulphonic acid, 2-sulphoethyl methacrylate, 2-acrylamido-2-methylpropane sulphonic acid 4-styrene sulphonic acid, monoacryloxyethyl phosphate, diallyldimethyl ammonium salts, quaternary salts of dimethylaminoethyl methacrylate and dimethylaminoethyl acrylate.

17. A process according to claim 15 wherein the polymeric stabiliser units

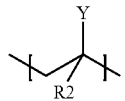

include moieties selected from acrylate esters, methacrylate esters, vinyl esters, vinyl halogens, styrene and optionally substituted styrenes.

18. A process for the production of microcapsules utilizing an oil-in-water emulsion prepared according to claim 6 wherein the reaction partner (ii) dissolved in the discontinuous oil phase and which reacts with the cross-linking group of the polymeric stabiliser is one or more monomers or pre-polymers and is capable of forming a microcapsule wall and wherein the discontinuous oil phase additionally contains one or more materials to be encapsulated, which process comprises forming microcapsules by interfacial polymerisation adjacent to the interface between the discontinuous phase and the continuous phase of the emulsion, wherein one or more of said wall-forming monomers or pre-polymers is reacted, before and/or after preparation of the emulsion, with the polymeric stabiliser of formula (I).

19. A process according to claim 18 wherein the monomer or pre-polymer is selected from aliphatic and aromatic diisocyanates, aliphatic and aromatic polyisocyanates and optionally etherified urea-formaldehyde pre-polymers.

20. A process according to claim 18 wherein the polymeric stabiliser comprises from 0.5 to about 8 percent by weight of the discontinuous phase that it stabilises.

21. A process according to claim 20 wherein the polymeric stabiliser comprises from 1 to 4 percent by weight of the discontinuous phase that it stabilises.

22. A microcapsule obtained by a process according to any of claim 18.

23. A microcapsule according to claim 22 which contains an agrochemical active ingredient in the liquid core.

24. An oil-in-water emulsion obtained by a process according to any of claim 1.

* * * * *

UNITED STATES PATENT AND TRADEMARK OFFICE
CERTIFICATE OF CORRECTION

PATENT NO. : 7,199,185 B2
APPLICATION NO. : 10/480405
DATED : April 3, 2007
INVENTOR(S) : Alexander Mark Heming et al.

It is certified that error appears in the above-identified patent and that said Letters Patent is hereby corrected as shown below:

Claim 2, Column 36, Line 50: "—$N^+R_3{}^3C^{31}$" should read as -- —$N^+R_3{}^3C^-$ --

Claim 13, Column 39, Line 10: "—$OCH_2CH_2N^-Me_2$" should read as -- —$OCH_2CH_2N^+Me_2$ --

Claim 13, Column 39, Line 13: "—$OCH_2CH_2N^-R_3X$" should read as -- —$OCH_2CH_2N^+R_3X$ --

Signed and Sealed this

Twenty-ninth Day of April, 2008

JON W. DUDAS
*Director of the United States Patent and Trademark Office*